United States Patent
Fujita et al.

(10) Patent No.: US 10,190,826 B2
(45) Date of Patent: Jan. 29, 2019

(54) CONDENSER FOR CONDENSING STEAM FROM A STEAM TURBINE

(71) Applicant: MITSUBISHI HITACHI POWER SYSTEMS, LTD., Kanagawa (JP)

(72) Inventors: Issaku Fujita, Tokyo (JP); Taichi Nakamura, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 15/037,821

(22) PCT Filed: Dec. 10, 2014

(86) PCT No.: PCT/JP2014/082751
§ 371 (c)(1),
(2) Date: May 19, 2016

(87) PCT Pub. No.: WO2015/111318
PCT Pub. Date: Jul. 30, 2015

(65) Prior Publication Data
US 2016/0290723 A1    Oct. 6, 2016

(30) Foreign Application Priority Data
Jan. 23, 2014 (JP) .................................. 2014-010716

(51) Int. Cl.
*F22B 37/00* (2006.01)
*F28B 1/02* (2006.01)
(Continued)

(52) U.S. Cl.
CPC .................. *F28B 1/02* (2013.01); *F01K 5/00* (2013.01); *F01K 9/00* (2013.01); *F01K 9/003* (2013.01); *F28B 9/10* (2013.01)

(58) Field of Classification Search
CPC ... F01K 9/003; F01K 9/00; F01K 5/00; F28B 9/10; F28B 1/02
See application file for complete search history.

(56) References Cited

U.S. PATENT DOCUMENTS 1,556,697 A * 10/1925 Leach ...................... F28B 1/02
                                                 165/158
3,193,002 A *  7/1965 Ritz ......................... F22D 1/32
                                                 165/139
(Continued)

FOREIGN PATENT DOCUMENTS

CH           464256 A  * 10/1968  ................ F28B 1/02
JP        53-118606       10/1978
(Continued)

OTHER PUBLICATIONS

Notification of Reasons for Refusal dated Apr. 11, 2017 in Japanese Application No. 2015-558751, with English translation.
(Continued)

*Primary Examiner* — Ljiljana Ciric
(74) *Attorney, Agent, or Firm* — Wenderoth, Lind & Ponack, L.L.P.

(57) ABSTRACT

A condenser includes: a vessel (11) configured to receive a steam flow (S) in a first horizontal direction (X); and cooling tube groups (21, 22, 23, 24) elongated in the first horizontal direction (X) inside the vessel. Each of the cooling tubes groups has a plurality of cooling tubes (31) that are disposed in parallel and extend in a second horizontal direction (Y), which intersects with the first horizontal direction. A hollow portion (32) is formed in the first horizontal direction (X) inside each of the cooling tube groups. A non-condensed gas discharge unit (33) is arranged in the second horizontal direction (Y) at a downstream side of each of the cooling tube groups and includes an opening portion (34) on the hollow portion side. Each of the cooling tube groups
(Continued)

includes a partition member (35) extending from the non-condensed gas discharge unit and open at the hollow portion.

21 Claims, 12 Drawing Sheets

(51) Int. Cl.
*F01K 9/00* (2006.01)
*F28B 9/10* (2006.01)
*F01K 5/00* (2006.01)

(56) References Cited

U.S. PATENT DOCUMENTS

| | | | | |
|---|---|---|---|---|
| 3,885,621 | A * | 5/1975 | Slebodnick | F22D 1/32 122/32 |
| 4,240,502 | A * | 12/1980 | Larinoff | F28B 1/06 165/112 |
| 4,732,004 | A * | 3/1988 | Brand | B01D 19/001 60/646 |
| 4,776,170 | A * | 10/1988 | Blangetti | B01D 19/001 60/685 |
| 5,018,572 | A | 5/1991 | Blangetti et al. | |
| 5,060,600 | A * | 10/1991 | Brown | F01K 21/06 122/1 R |
| 5,159,975 | A * | 11/1992 | Murphy | F28B 1/02 165/110 |
| 5,507,356 | A * | 4/1996 | Roth | B01D 3/14 165/111 |
| 5,794,686 | A * | 8/1998 | Baumann | F28B 1/02 165/112 |
| 5,941,301 | A | 8/1999 | Baumann | |
| 5,960,867 | A * | 10/1999 | Takahashi | F28B 1/02 165/114 |
| 6,269,867 | B1 * | 8/2001 | Takahashi | F28B 1/02 165/114 |
| 9,671,173 | B2 * | 6/2017 | Daly | F28D 15/02 |
| 2006/0112693 | A1 * | 6/2006 | Sundel | F01K 15/00 60/670 |
| 2006/0236865 | A1 * | 10/2006 | Jellema | B01D 5/0027 95/149 |
| 2009/0126912 | A1 * | 5/2009 | Reddy | F28B 1/02 165/110 |
| 2010/0065253 | A1 * | 3/2010 | Fujita | F28B 1/02 165/104.21 |
| 2010/0276122 | A1 * | 11/2010 | Daly | B01D 5/0009 165/111 |
| 2010/0319879 | A1 * | 12/2010 | Sugitani | F01K 9/00 165/104.21 |
| 2015/0330260 | A1 * | 11/2015 | Bapat | F01K 17/04 60/653 |
| 2016/0290723 | A1 * | 10/2016 | Fujita | F01K 9/003 |
| 2017/0307300 | A1 * | 10/2017 | Daly | F28F 1/10 |

FOREIGN PATENT DOCUMENTS

| | | |
|---|---|---|
| JP | 56-40272 | 9/1981 |
| JP | 59-139767 | 9/1984 |
| JP | 10-170168 | 6/1998 |
| JP | 2930647 | 5/1999 |
| JP | 2000-18845 | 1/2000 |
| JP | 2001-153569 | 6/2001 |
| JP | 2007-178101 | 7/2007 |
| JP | 2008-241211 | 10/2008 |

OTHER PUBLICATIONS

International Search Report dated Mar. 10, 2015 in International (PCT) Application No. PCT/JP2014/082751.
Written Opinion of the International Searching Authority dated Mar. 10, 2015 in corresponding International Application No. PCT/JP2014/082751 (with English translation).
Office Action dated Aug. 21, 2017 in corresponding Korean patent application No. 10-2016-7014258, with English translation.

* cited by examiner

CONDENSER FOR CONDENSING STEAM FROM A STEAM TURBINE

BACKGROUND OF THE INVENTION

1. Technical Field

The present invention relates to a condenser that condenses steam flowing from a steam turbine and generates condensate.

2. Description of the Related Art

In a steam turbine system, steam is generated by combusting fuel in a boiler and transmitting thermal energy of the generated combustion gas to boiler water, and this steam is heated by a superheater to become superheated steam, and then a generator is driven by rotating a turbine with the superheated steam and generates power. The steam having worked by rotating the turbine is condensed in a condenser by being cooled by heat exchange with, for example, sea water as cooling water, and reverts to condensate, and then is returned to the boiler by a condensate pump.

The condenser includes a vessel in communication with an exhaust port of the turbine, and is formed by horizontally disposing, inside the vessel, a cooling tube group including multiple cooling tubes in which cooling water flows. Furthermore, steam exhausted from the turbine is introduced into the cooling tube group, and heat exchange is performed between the steam and the cooling water contained inside the respective cooling tubes, thereby condensing the steam into condensate.

In this kind of condenser, as an axial condenser, there is a technology disclosed in Japanese Laid-open Patent Publication No. 2007-178101, for example. According to the condenser disclosed in JP 2007-178101, a cooling tube group including a plurality of cooling tubes is provided in a hollow vessel in a direction substantially orthogonal to an inflow direction of steam having swirl flow, and this cooling tube group has an entirely dense form in which the plurality of cooling tubes is arranged substantially at equal intervals. Additionally, as a down-flow system condenser, there is a technology disclosed in Japanese Laid-open Patent Publication No. 2000-018845. In a cooling tube device of the condenser disclosed in JP 2000-018845, a cooling tube group is formed of an upper tube subgroup and a lower tube subgroup while having a horizontal tray as a boarder therebetween, and an air moving passage is provided inside the cooling tube group and furthermore an air cooling unit is provided between the upper tube subgroup and the lower tube subgroup.

SUMMARY OF THE INVENTION

1. Technical Problem

In the condenser disclosed in JP 2007-178101, the cooling tube group is substantially circle-shaped, and condensate having been condensed in an upper half portion of the cooling tube group may fall on a lower half portion of the cooling tube group, thereby possibly causing reduction of an effective area for steam condensation and also degradation of condensation performance. Furthermore, the steam having flown to the back of the cooling tube group may enter a back half portion of the cooling tube group, thereby possibly causing backflow of the steam, and this may also cause degradation of condensation performance. Moreover, since the condenser disclosed in JP 2000-018845 is a down-flow system condenser, the same condensation performance can be hardly obtained in the case of applying the condenser as an axial condenser.

The present invention is achieved to solve the above-described problems, and directed to providing a condenser that can improve condensation performance.

2. Solution to the Problem

In order to achieve the above object, a condenser according to an aspect of the present invention includes: a vessel into which steam is introduced in a first horizontal direction; a cooling tube group elongated in the first horizontal direction inside the vessel and including a plurality of cooling tubes in a second horizontal direction intersecting with the first horizontal direction; a hollow portion formed in the first horizontal direction inside the cooling tube group; a non-condensed gas discharge unit arranged in the second horizontal direction at a downstream end portion in a flow direction of the steam in the cooling tube group, and including an opening portion on the hollow portion side; and a partition member opened to the hollow portion side from the opening portion side of the non-condensed gas discharge unit.

Therefore, the steam introduced into the vessel in the first horizontal direction enters the inside from the upper portion and the lower portion of the cooling tube group and flows to the hollow portion. At this point, heat exchange is performed by the steam contacting the multiple cooling tubes, and the steam is cooled and condensed into condensate. Then, the condensate settles down. On the other hand, the non-condensed gas generated by cooling the steam is guided by the partition member, collected in the non-condensed gas discharge unit through the opening portion, and discharged to the outside. Since the cooling tube group is elongated in the flow direction of the steam and the hollow portion is formed in the flow direction of the steam inside thereof, the steam can efficiently contact the cooling tubes and also the non-condensed gas can be properly separated. As a result, condensation performance can be improved. Furthermore, since the non-condensed gas discharge unit is arranged at the downstream end portion in the flow direction of the steam in the cooling tube group, a pipe to discharge the non-condensed gas from the non-condensed gas discharge unit can be easily connected, and manufacturing cost can be saved by simplifying the structure.

Advantageously, in the condenser of the present invention, the non-condensed gas discharge unit has a hollow shape and is arranged such that surfaces other than one surface are surrounded by the cooling tube group and the one surface faces a steam passage and also faces an inner wall surface of the vessel.

Therefore, since the non-condensed gas discharge unit is enclosed by the cooling tube group, there is no object protruding outward from the cooling tube group and flow of the steam can be prevented from being disturbed. Additionally, since the one surface of the non-condensed gas discharge unit faces the inner wall surface of the vessel, a discharge pipe to discharge the non-condensed gas collected in the non-condensed gas discharge unit to the outside of the vessel can be easily arranged, and the structure can be simplified.

Advantageously, in the condenser of the present invention, the partition member includes: an upper partition plate arranged in the second horizontal direction and having a proximal end portion connected to an upper portion of the non-condensed gas discharge unit; and a lower partition plate arranged in the second horizontal direction and having a proximal end portion connected to a lower portion of the non-condensed gas discharge unit, and the upper partition plate and the lower partition plate have respective distal end portions in communication with the hollow portion.

Therefore, since the upper partition plate and the lower partition plate constituting the partition member are in communication with the hollow portion, the non-condensed gas remaining in the hollow portion can be properly guided to the non-condensed gas discharge unit by the upper partition plate and the lower partition plate.

Advantageously, in the condenser of the present invention, the upper partition plate extends upward at a predetermined inclination angle toward the hollow portion side.

Therefore, since the upper partition plate is inclined upward, the condensate adhering to an upper surface portion of the upper partition plate is made to flow along the upper surface portion of the upper partition plate, pass over an upper surface portion of the non-condensed gas discharge unit, and fall down outside of the cooling tube group. Consequently, retention of the condensate at the upper surface portions of the upper partition plate and the non-condensed gas discharge unit can be prevented, and furthermore, adhesion of the condensate to the cooling tube group can be suppressed.

Advantageously, in the condenser of the present invention, the upper partition plate and the lower partition plate are arranged such that a distance between the upper partition plate and the lower partition plate becomes larger toward the hollow portion side.

Therefore, since the interval between the upper partition plate and the lower partition plate becomes larger toward the hollow portion side, a flow passage to the non-condensed gas discharge unit from the hollow portion becomes narrower, and flow of the non-condensed gas is speeded up. Therefore, the non-condensed gas can be efficiently guided to the non-condensed gas discharge unit.

Advantageously, in the condenser of the present invention, a baffle plate is arranged at a position separated from the non-condensed gas discharge unit to the hollow portion side by a predetermined distance in a manner facing the opening portion and keeping a predetermined space from the upper partition plate and the lower partition plate.

Therefore, since the baffle plate is arranged facing the opening portion, flow of the non-condensed gas flowing from the hollow portion to the non-condensed gas discharge unit is speeded up at the time of passing through spaces between the upper and lower partition plates and the baffle plate. Therefore, the non-condensed gas can be efficiently guided to the non-condensed gas discharge unit. Furthermore, when the non-condensed gas contains steam, the steam can be condensed by contacting the cooling tubes.

Advantageously, in the condenser of the present invention, an upper gas flow passage is provided along an upper surface of the upper partition plate, a lower gas flow passage is provided along a lower surface of the lower partition plate, and the upper gas flow passage and the lower gas flow passage are in communication with the hollow portion.

Therefore, the steam having entered the inside by passing around the cooling tube group is condensed by contacting the cooling tubes, and the generated non-condensed gas moves to the hollow portion by passing through the upper gas flow passage and the lower gas flow passage. Consequently, the non-condensed gas can be properly guided to the hollow portion.

Advantageously, in the condenser of the present invention, an upper gas flow passage is provided along an upper surface of the upper partition plate, a lower gas flow passage is provided along a lower surface of the lower partition plate, and the cooling tubes are arranged in the space between the upper and lower gas flow passages and the hollow portion.

Therefore, the steam having entered the inside by passing around the cooling tube group is condensed by contacting the cooling tubes, and the generated non-condensed gas moves to the hollow portion by passing through the upper gas flow passage and the lower gas flow passage. When the non-condensed gas contains steam, the steam can be condensed by contacting the cooling tubes.

Advantageously, in the condenser of the present invention, the upper partition plate and the lower partition plate have distal end portions provided with an upper guide portion and a lower guide portion respectively which are bent in directions approaching to each other.

Therefore, the steam having entered the inside by passing around the cooling tube group is condensed by contacting the cooling tubes, and the generated non-condensed gas moves to the hollow portion by passing through the upper gas flow passage and the lower gas flow passage. At this point, when the non-condensed gas contains steam, the steam is prevented from flowing between the upper partition plate and the lower partition plate by the upper guide portion and the lower guide portion.

Advantageously, in the condenser of the present invention, a plurality of saucers is arranged in the first horizontal direction at predetermined intervals at a lower portion of the hollow portion.

Therefore, since the plurality of saucers is arranged at the lower portion of the hollow portion, it is possible to prevent adhesion of the condensate to the cooling tube caused by the condensate falling after being generated by condensing the steam. Furthermore, vertical flow of the steam is enabled and degradation of condensation performance can be suppressed.

Advantageously, in the condenser of the present invention, the cooling tube group, the hollow portion, the non-condensed gas discharge unit, and the partition member are provided in a vertically line-symmetric shape.

Therefore, the vertically line-symmetric shape enables uniform condensation performance in upper and lower areas.

Advantageously, in the condenser of the present invention, the cooling tube group is divided into an upper cooling tube subgroup and a lower cooling tube subgroup relative to the hollow portion, and a thickness in the vertical direction of the upper cooling tube subgroup is set thicker than a thickness in the vertical direction of the lower cooling tube subgroup.

Therefore, when the steam flows toward the cooling tube group, the generated condensate falls down and adheres to the cooling tubes of the lower cooling tube subgroup. However, since the thickness of the upper cooling tube subgroup is thicker than the lower cooling tube subgroup, a more amount of steam is condensed by the upper cooling tube subgroup, thereby improving condensation performance.

Advantageously, in the condenser of the present invention, the non-condensed gas discharge unit has a hollow shape and is arranged in a manner projecting from the cooling tube group, facing a steam passage, and also facing an inner wall surface of the vessel.

Therefore, since the non-condensed gas discharge unit is formed projecting outward from the cooling tube group, the number of the cooling tubes can be increased and condensation performance can be improved. Furthermore, since the one surface of the non-condensed gas discharge unit faces the inner wall surface of the vessel, a discharge pipe to discharge the non-condensed gas collected in the non-condensed gas discharge unit to the outside of the vessel can be easily arranged, and the structure can be simplified.

Advantageously, in the condenser of the present invention, the hollow portion is gradually tapered toward an upstream side in a flow direction of steam in the cooling tube group.

Therefore, condensation performance can be improved by properly separating the non-condensed gas from the steam and efficiently guiding the non-condensed gas to the non-condensed gas discharge unit.

3. Advantageous Effects of the Invention

According to the condenser of the present invention, provided are: the cooling tube group elongated in the first horizontal direction; the hollow portion formed in the first horizontal direction inside the cooling tube group; the non-condensed gas discharge unit arranged at the downstream end portion in the flow direction of the steam in the cooling tube group; and the partition member opened to the hollow portion side from the opening portion side of the non-condensed gas discharge unit. Consequently, condensation performance can be improved, and furthermore manufacturing cost can be saved by simplifying the structure.

DETAILED DESCRIPTION OF THE EMBODIMENTS

In the following, preferred embodiments of a condenser according to the present invention will be described in detail with reference to the accompanying drawings. Note that the present invention is not limited to the embodiments and intended to include configurations in which the respective embodiments are combined in the case where there is a plurality of embodiments.

First Embodiment

Figure 3:
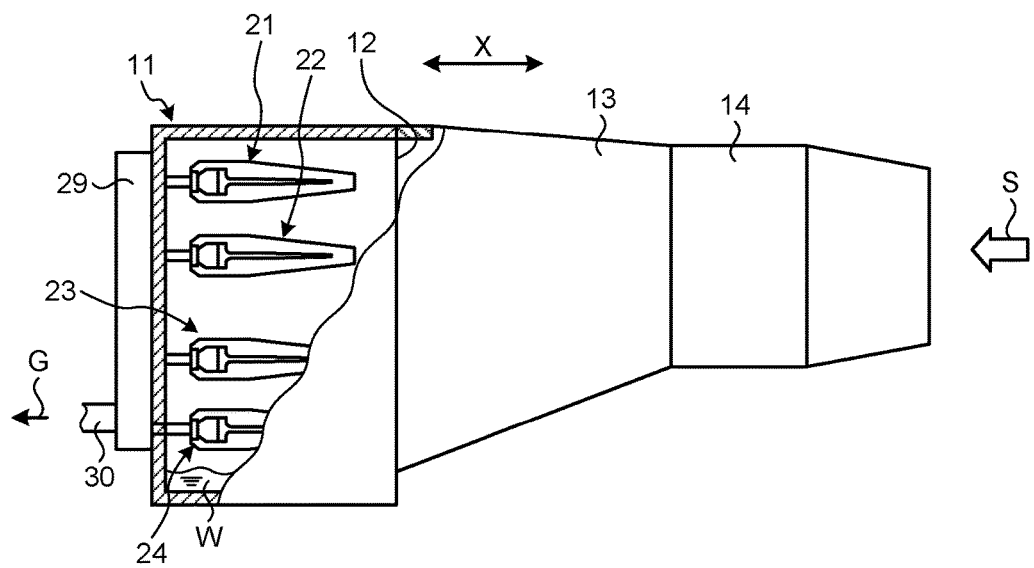
FIG. 3 is a side view in which the condenser is partly cut off.
Figure 4:
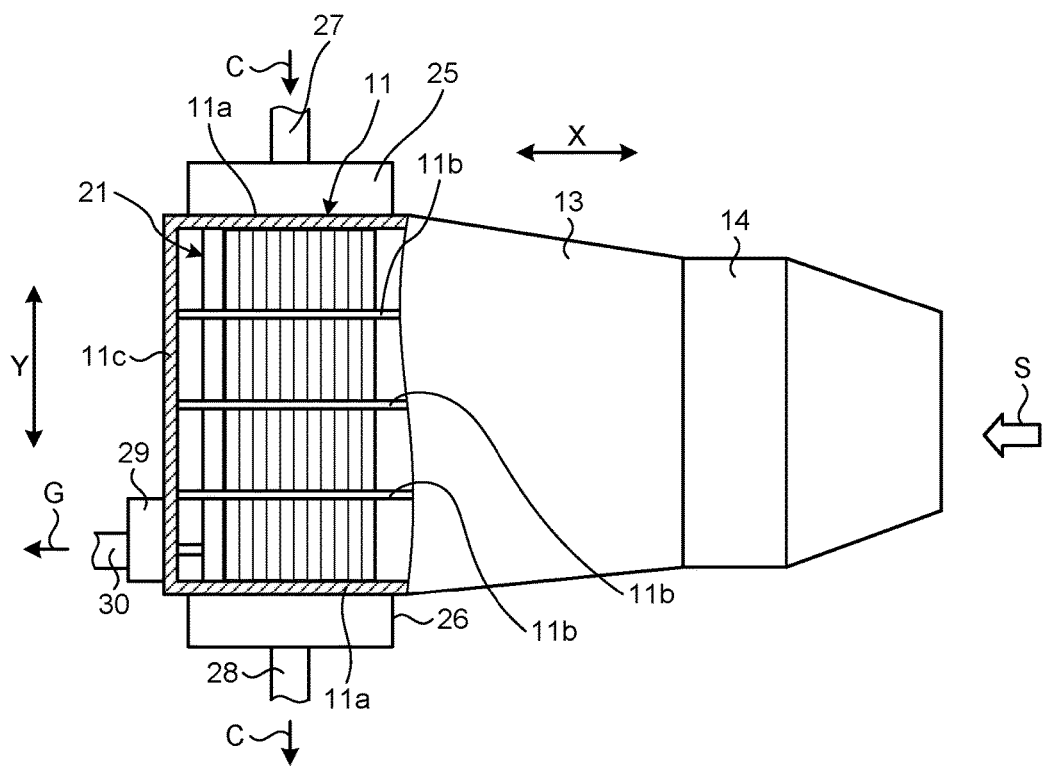
FIG. 4 is a plan view in which the condenser is partly cut off.

FIG. 3 is a side view in which a condenser is partly cut off, and FIG. 4 is a plan view in which the condenser is partly cut off. In the following description, note that a first horizontal direction X is a direction in which steam is introduced into a vessel, and a second horizontal direction Y is a direction orthogonal to (intersecting with) the first horizontal direction X.

A condenser according to the first embodiment is an axial condenser mounted on a steam turbine. In the condenser, as illustrated in FIGS. 3 and 4, a vessel 11 has a hollow box-like shape, an inflow port 12 is provided at one end portion in the first horizontal direction X, and the inflow port 12 is connected, via a transfer cylinder 13, to an exhaust chamber 14 of a steam turbine not illustrated. Therefore, steam S having swirl flow and flowing from the steam turbine is exhausted to the exhaust chamber 14, and flows into the vessel 11 from the inflow port 12 through the transfer cylinder 13 in the first horizontal direction X.

Inside the vessel 11, four cooling tube groups 21, 22, 23, 24 are disposed in the second horizontal direction Y substantially orthogonal to an inflow direction (first horizontal direction X) of the steam S having swirl flow and flowing from the inflow port 12. The four cooling tube groups 21, 22, 23, 24 are arranged at predetermined intervals in a vertical direction. Each of the cooling tube groups 21, 22, 23, 24 is formed of a plurality of cooling tubes disposed in the second horizontal direction Y inside the vessel 11. Each of the cooling tubes has end portions respectively supported by side walls 11a of the vessel 11, and has a middle portion supported by a plurality of tube support plates 11b. Furthermore, in the cooling tube groups 21, 22, 23, 24, the end portions of each of the cooling tubes are in communication with an inlet water chamber 25 and an outlet water chamber 26 provided respectively outside the side walls 11a. The inlet water chamber 25 is connected to a cooling water supply pipe 27 and the outlet water chamber 26 is connected to a cooling water discharge pipe 28. Furthermore, the vessel 11 is provided with an air chamber 29 outside a rear wall 11c, and air (non-condensed gas) generated inside the vessel 11 by cooling the steam is collected therein. The air chamber 29 is connected to an air discharge pipe 30.

Therefore, when cooling water C is supplied from the cooling water supply pipe 27 to the inlet water chamber 25, the cooling water C is made to flow into the respective cooling tubes of the cooling tube groups 21, 22, 23, 24. The cooling water C is made to flow out to the outlet water chamber 26 through the respective cooling tubes, and discharged from the cooling water discharge pipe 28. At this point, the steam S contacts the respective cooling tubes in the cooling tube groups 21, 22, 23, 24, thereby performing heat exchange. More specifically, the steam S becomes condensate W by being cooled and condensed, and the condensate settles down and is stored at a bottom portion of the vessel 11. On the other hand, non-condensed gas G generated by cooling the steam S is collected in the air chamber 29 and discharged to the outside from the air discharge pipe 30.

In the following, structures of the cooling tube groups 21, 22, 23, 24 will be described in detail. Since the cooling tube groups 21, 22, 23, 24 have substantially the same structure, particularly only the cooling tube group 21 will be described in detail.

Figure 1:
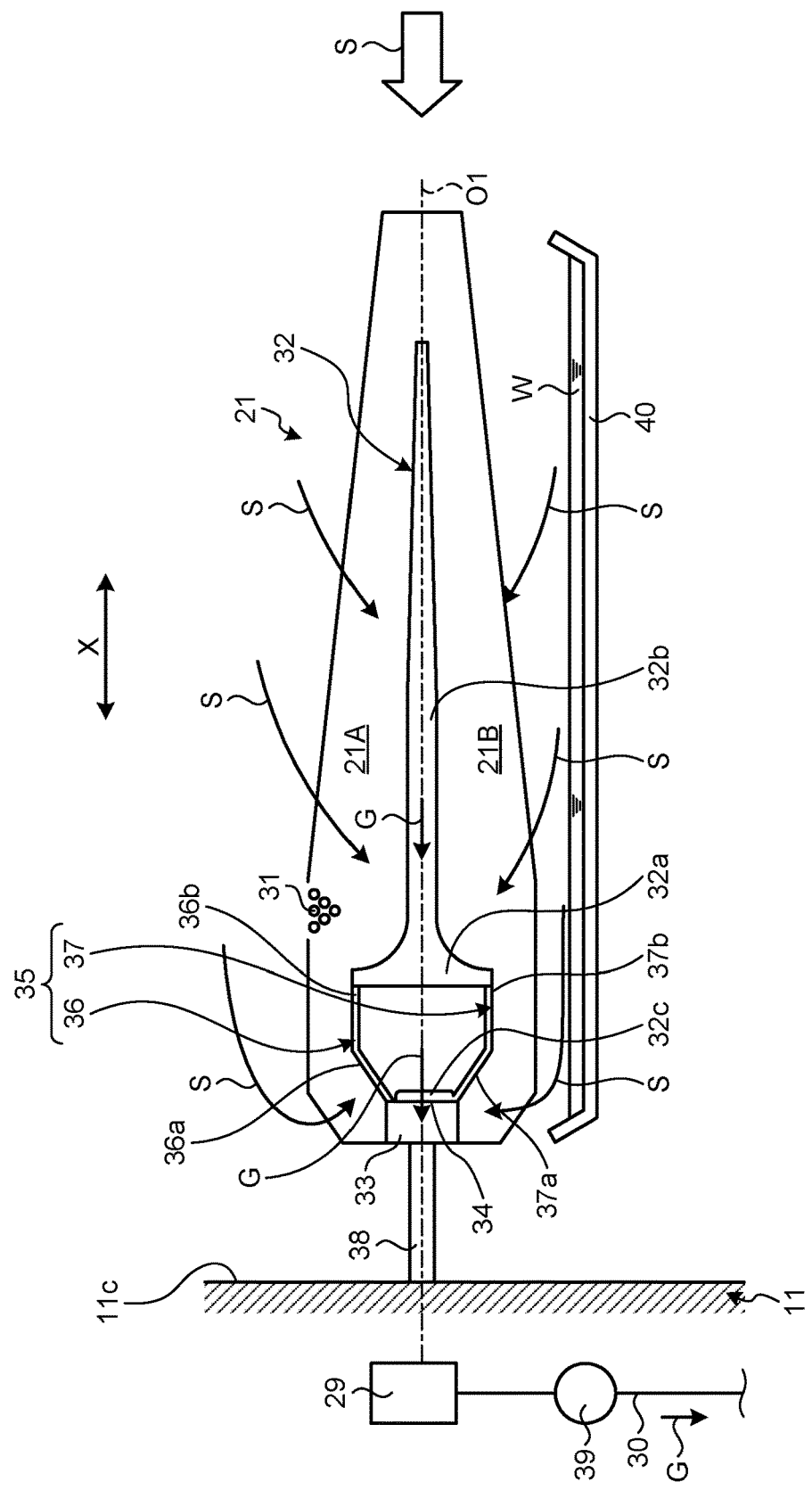
FIG. 1 is a schematic diagram illustrating a cooling tube group in a condenser according to a first embodiment.
Figure 2:
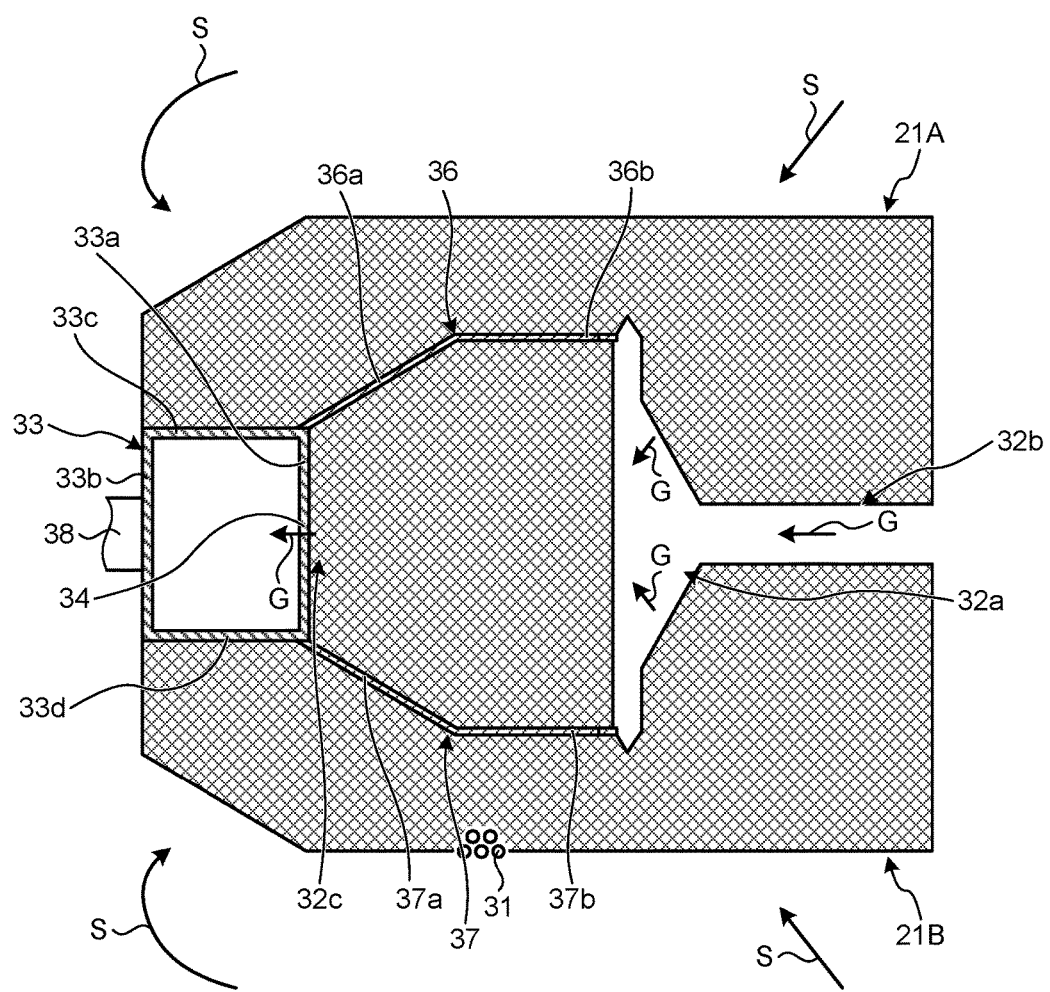
FIG. 2 is an enlarged view illustrating a main portion of the cooling tube group.

FIG. 1 is a schematic diagram illustrating a cooling tube group in the condenser according to the first embodiment, and FIG. 2 is an enlarged view illustrating a main portion of the cooling tube group.

As illustrated in FIGS. 1 and 2, the cooling tube group 21 is elongated in the first horizontal direction X by arranging a plurality of cooling tubes 31 in the second horizontal direction (orthogonal to the drawing paper surface) in parallel at predetermined intervals. Furthermore, the cooling tube group 21 has a shape tapered toward an upstream side in a flow direction of the steam S. More specifically, in the cooling tube group 21, a length dimension in the first horizontal direction X is set larger than a height (thickness) in the vertical direction. The cooling tube 31 is a cylindrical tube having a predetermined outside diameter, and the cooling tubes 31 facing each other in the vertical direction are arranged in a manner shifted in the horizontal direction by a predetermined distance. More specifically, three adjacent cooling tubes 31 form an equilateral triangle having a base extending in the horizontal direction, and a height of this triangle is short relative to a width.

A hollow portion 32 is formed in the first horizontal direction X inside the cooling tube group 21. The hollow portion 32 includes a first hollow portion 32a provided on a downstream side in the flow direction of the steam S (first horizontal direction X) and a second hollow portion 32b provided in a manner extending from the first hollow portion 32a toward the upstream side in the flow direction of the steam S (first horizontal direction X). The first hollow portion 32a has a trapezoidal cross-section (triangular cross-section) and is provided in a longitudinal direction (second horizontal direction) of the cooling tube 31. The second hollow portion 32b has a bar-like shape that becomes gradually tapered toward the upstream side in the flow direction of the steam S, and is provided in the longitudinal direction (second horizontal direction) of the cooling tube 31. The first hollow portion 32a is in communication with the second hollow portion 32b.

A non-condensed gas discharge unit 33 is arranged in the second horizontal direction at a downstream end portion in the flow direction of the steam in the cooling tube group 21. The non-condensed gas discharge unit 33 is a hollow box body having a rectangular cross-section and includes a front surface portion 33a, a back surface portion 33b, an upper surface portion 33c, and a lower surface portion 33d. Furthermore, the front surface portion 33a, upper surface portion 33c, and lower surface portion 33d other than the back surface portion (one surface) 33b are enclosed by the cooling tube group 21, and the back surface portion (one surface) 33b is exposed to the outside. More specifically, the non-condensed gas discharge unit 33 is arranged with the back surface portion (one surface) 33b facing a steam passage side from the cooling tube group 21 and also facing an inner wall surface of the rear wall 11c of the vessel 11.

Furthermore, in the non-condensed gas discharge unit 33, opening portions 34 are formed in the front surface portion 33a on the hollow portion 32 side. The opening portions 34 are through-holes having a circular shape and penetrating the front surface portion 33a, and are arranged at predetermined intervals in the second horizontal direction. Note that only one row of the opening portions 34 is provided in the second horizontal direction, but two or more rows thereof may be provided as well. Additionally, the shape is not limited to the circular shape but may be a rectangular shape or may also be a slit shape.

A partition member 35 is opened to the hollow portion 32 side from the opening portion 34 side of the non-condensed gas discharge unit 33. The partition member 35 is formed of an upper partition plate 36 and a lower partition plate 37. The upper partition plate 36 is arranged in the second horizontal direction, and has a proximal end portion connected to an upper portion of the front surface portion 33a of the non-condensed gas discharge unit 33. The lower partition plate 37 is arranged in the second horizontal direction, and has a proximal end portion connected to a lower portion of the front surface portion 33a of the non-condensed gas discharge unit 33. Furthermore, the upper partition plate 36 and the lower partition plate 37 respectively have distal end portions in communication with the hollow portion 32.

The upper partition plate 36 extends upward at a predetermined inclination angle toward the hollow portion 32 side. The lower partition plate 37 extends downward at a predetermined inclination angle toward the hollow portion 32 side. Therefore, in the partition member 35, the upper partition plate 36 and the lower partition plate 37 are arranged such that an interval (distance) therebetween becomes larger toward the hollow portion 32 side. More specifically, the upper partition plate 36 includes an inclined portion 36a fixed to the upper portion of the front surface portion 33a of the non-condensed gas discharge unit 33, and has a horizontal portion 36b connected to the inclined portion 36a and in communication with the hollow portion 32. Additionally, the lower partition plate 37 includes an inclined portion 37a fixed to the lower portion of the front surface portion 33a of the non-condensed gas discharge unit 33, and has a horizontal portion 37b connected to the inclined portion 37a and in communication with the hollow portion 32. Therefore, in the partition member 35, since the respective inclined portions 36a, 37a vertically face each other, the interval between the upper partition plate 36 and the lower partition plate 37 becomes gradually larger toward the hollow portion 32 side, and since the respective horizontal portions 36b, 37b vertically face each other, the interval between the upper partition plate 36 and the lower partition plate 37 is constant.

Furthermore, the partition member 35 (upper partition plate 36 and lower partition plate 37) is opened to the hollow portion 32 side from the non-condensed gas discharge unit 33, and the distal end portion thereof is in communication with the first hollow portion 32a of the hollow portion 32. The hollow portion 32 is provided with a third hollow portion 32c in addition to the first hollow portion 32a and the second hollow portion 32b. The third hollow portion 32c is provided facing the front surface portion 33a of the non-condensed gas discharge unit 33. Meanwhile, the plurality of cooling tubes 31 is arranged at equal intervals, with predetermined spaces having the same dimension interposed between all of adjacent cooling tubes. The hollow portion 32 (32a, 32b, 32c) is an area in which a space between the adjacent cooling tubes 31, or a space between the cooling tube 31 and other members (such as the non-condensed gas discharge unit 33 and the partition member 35), and a space between other members are set larger than the predetermined space.

The cooling tube group 21, hollow portion 32, non-condensed gas discharge unit 33, and partition member 35 thus configured are provided in a vertically line-symmetric shape relative to a horizontal center line O1. Particularly, the cooling tube group 21 is divided into a cooling tube group upper area 21A and a cooling tube group lower area 21B relative to the hollow portion 32 located on the center line O1, and the thickness (height) of the cooling tube group upper area 21A is set to be the same as that of the cooling tube group lower area 21B.

The non-condensed gas discharge unit 33 has one end portion of a connection pipe 38 connected to the back surface portion 33b, and the other end portion connected to the air chamber 29 arranged outside the vessel 11. A vacuum pump 39 is mounted on the air discharge pipe 30. Therefore, negative pressure can be applied to the non-condensed gas discharge unit 33 by actuating the vacuum pump 39 through the air discharge pipe 30, air chamber 29, and connection pipe 38.

Furthermore, the cooling tube group 21 is provided with a tray 40 to receive condensed condensate that falls downward. The tray 40 is arranged below the cooling tube group 21 in the second horizontal direction, and has an end portion connected to a condensate discharge pipe not illustrated. A length of the tray 40 is preferably set to the same length as the cooling tube group 21 in the first horizontal direction X, but a distal end portion side of the tray 40 may be cut off to shorten the length because the falling condensate is made to flow to the downstream side by the flow of the steam S.

Now, behavior of the condenser according to the first embodiment will be described.

As illustrated in FIG. 1, when the steam S having the swirl flow and flowing from the steam turbine flows into the vessel 11 from the inflow port 12 in the first horizontal direction X, the steam S reaches each of the cooling tube groups 21, 22, 23, 24 and contacts the multiple cooling tubes 31. Subsequently, heat exchange is performed between the steam S and the cooling water C contained inside each of the cooling tubes 31, thereby the steam S is cooled and condensed into the condensate W and stored at a lower portion of the vessel 11.

At this point, as illustrated in FIGS. 1 and 2, the steam S flows into the cooling tube group upper area 21A of the cooling tube group 21 from above, and flows into the cooling tube group lower area 21B from below. Here, since the cooling tube group upper area 21A and the cooling tube group lower area 21B have the same thickness, the condensate can be generated substantially uniformly in both areas. More specifically, negative pressure is applied to the non-condensed gas discharge unit 33 by actuation of the vacuum pump 39, and suction force is applied to the hollow portion 32 by the partition member 35. Therefore, the steam S moves to the inside of the hollow portion 32 through the cooling tube group 21, and during this time, the steam S is cooled and condensed by contacting the cooling tubes 31.

Then, when the steam moves to the inside of the hollow portion 32 through the cooling tube group 21, the steam becomes the non-condensed gas G by being cooled and generating the condensate. The non-condensed gas G having moved to the respective hollow portions 32a, 32b is guided by the partition member 35, moves to the third hollow portion 32c, is collected in the non-condensed gas discharge unit 33 through the opening portions 34, and is discharged to the outside from the air discharge pipe 30 through the connection pipe 38 and the air chamber 29.

Thus, in the condenser according to the first embodiment, provided are: the vessel 11 into which the steam S is introduced in the first horizontal direction X; the cooling tube groups 21, 22, 23, 24 each elongated in the first horizontal direction X inside the vessel 11 by arranging the plurality of cooling tubes 31 in parallel in the second horizontal direction Y; the hollow portion 32 formed inside each of the cooling tube groups 21, 22, 23, 24 in the first horizontal direction X; the non-condensed gas discharge unit 33 arranged in the second horizontal direction Y at the downstream end portion in the flow direction of the steam S in each of the cooling tube groups 21, 22, 23, 24, and including the opening portions 34 on the hollow portion 32 side; and the partition member 35 opened to the hollow portion 32 side from the opening portion 34 side of the non-condensed gas discharge unit 33.

Therefore, the steam S introduced into the vessel 11 enters the inside from the upper portion and the lower portion in each of the cooling tube groups 21, 22, 23, 24, and flows to the hollow portion 32. At this point, heat exchange is performed by the steam S contacting the multiple cooling tubes 31, and the steam S is cooled and condensed into the condensate W. Then, the condensate W settles down. On the other hand, the non-condensed gas G generated by cooling the steam S is guided by the partition member 35, collected in the non-condensed gas discharge unit 33 through the opening portions 34, and discharged to the outside. Since each of the cooling tube groups 21, 22, 23, 24 is elongated in the flow direction of the steam S and the hollow portion 32 is formed inside in the flow direction of the steam S, the steam S efficiently contacts the cooling tubes 31 and also the non-condensed gas G can be properly separated. As a result, condensation performance can be improved. Furthermore, since the non-condensed gas discharge unit 33 is arranged at the downstream end portion in the flow direction of the steam S in each of the cooling tube groups 21, 22, 23, 24, a pipe to discharge the non-condensed gas G from the non-condensed gas discharge unit 33 can be easily connected, and manufacturing cost can be saved by simplifying the structure.

In the condenser according to the first embodiment, the non-condensed gas discharge unit 33 is formed hollow, the portions other than the back surface portion 33b are enclosed by each of the cooling tube groups 21, 22, 23, 24, and the back surface portion 33b is arranged in a manner facing the steam passage and also facing the inner wall surface of the vessel 11. Therefore, since the non-condensed gas discharge unit 33 is enclosed by each of the cooling tube groups 21, 22, 23, 24, there is no object projecting outward from the cooling tube groups 21, 22, 23, 24, and flow of the steam S can be prevented from being disturbed. Additionally, since the back surface portion 33b of the non-condensed gas discharge unit 33 faces the inner wall surface of the vessel 11, the air discharge pipe 30 to discharge the non-condensed gas G collected in the non-condensed gas discharge unit 33 to the outside of the vessel 11 can be easily arranged, and the structure can be simplified.

In the condenser according to the first embodiment, the upper partition plate 36 having the proximal end portion connected to the upper portion of the non-condensed gas discharge unit 33 and the lower partition plate 37 having the proximal end portion connected to the lower portion of the non-condensed gas discharge unit 33 are provided as the partition member 35, and the distal end portions of the upper partition plate 36 and the lower partition plate 37 are in communication with the hollow portion 32. Therefore, the non-condensed gas G remaining in the hollow portion 32 can be more properly guided to the non-condensed gas discharge unit 33 by the upper partition plate 36 and the lower partition plate 37.

In the condenser according to the first embodiment, the upper partition plate 36 extends upward at the predetermined inclination angle toward the hollow portion 32 side. Therefore, the condensate W adhering to an upper surface portion of the upper partition plate 36 is made to flow along the upper surface portion of the upper partition plate 36, pass over an upper surface portion of the non-condensed gas discharge unit 33, and fall on an outer side of each of the cooling tube groups 21, 22, 23, 24. Consequently, retention of the condensate W at the upper surface portions of the upper partition plate 36 and the non-condensed gas discharge unit 33 can be prevented, and furthermore, adhesion of the condensate W to the cooling tube groups 21, 22, 23, 24 can be suppressed.

In the condenser according to the first embodiment, the upper partition plate 36 and the lower partition plate 37 are arranged such that the interval therebetween becomes larger toward the hollow portion 32 side. Therefore, a flow passage from the hollow portion 32 to the non-condensed gas discharge unit 33 becomes narrower, and flow of the non-condensed gas G is speeded up. Therefore, the non-condensed gas G can be efficiently guided to the non-condensed gas discharge unit 33.

In the condenser according to the first embodiment, the cooling tube groups 21, 22, 23, 24, hollow portion 32, non-condensed gas discharge unit 33, and partition member 35 are provided in a vertically line-symmetric shape. Therefore, condensation can be performed uniformly in the upper and lower areas of the cooling tube groups 21, 22, 23, 24.

Figure 5:
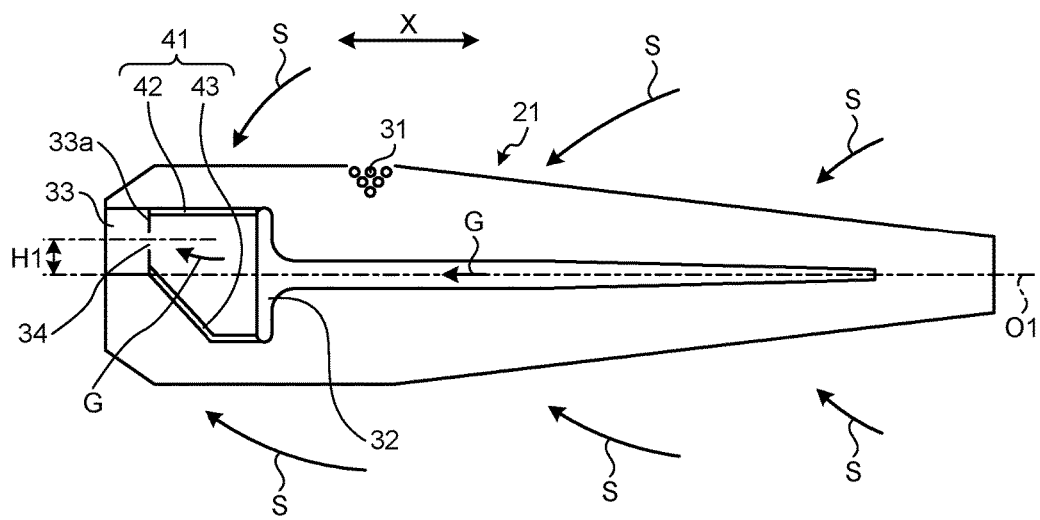
FIG. 5 is a schematic diagram illustrating a modified example of the cooling tube group in the condenser according to the first embodiment.
Figure 6:
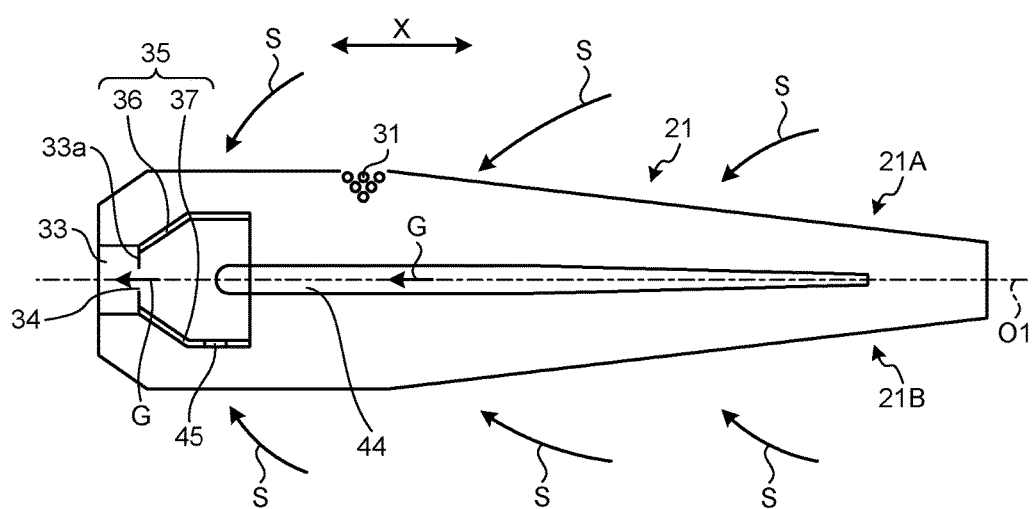
FIG. 6 is a schematic diagram illustrating a modified example of the cooling tube group in the condenser according to the first embodiment.
Figure 7:
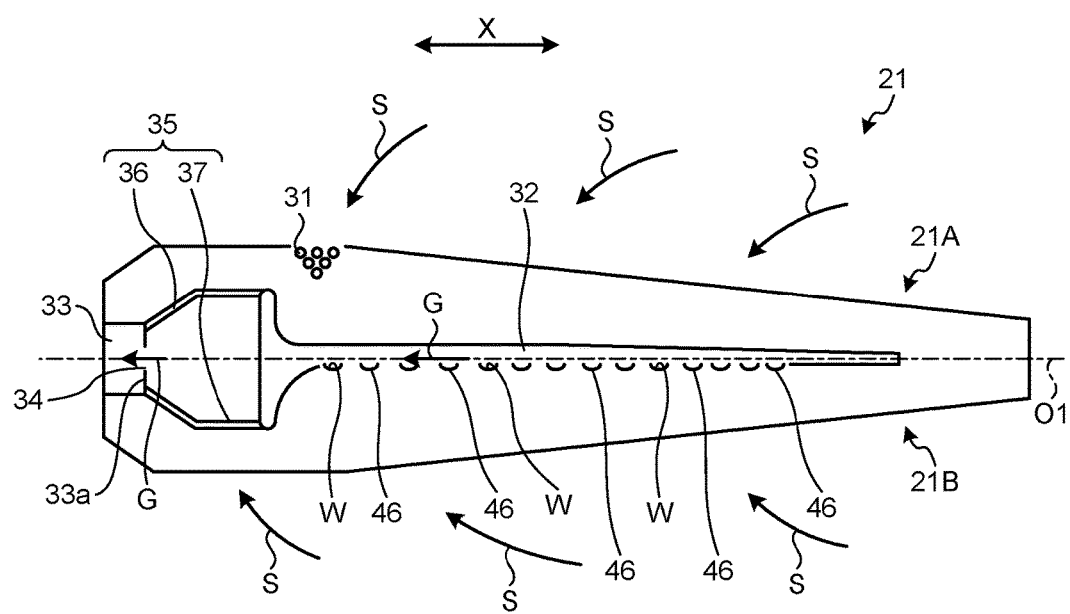
FIG. 7 is a schematic diagram illustrating a modified example of the cooling tube group in the condenser according to the first embodiment.

The shapes of the hollow portion 32, non-condensed gas discharge unit 33, and partition member 35 provided inside each of the cooling tube groups 21, 22, 23, 24 are not limited to the above-described embodiment. FIGS. 5 to 7 are schematic diagrams illustrating modified examples of the cooling tube group in the condenser according to the first embodiment.

As illustrated in FIG. 5, the cooling tube group 21 is elongated in the first horizontal direction X by arranging the plurality of cooling tubes 31 in the second horizontal direction (orthogonal to the drawing paper surface) in parallel at predetermined intervals. The hollow portion 32 is formed in the first horizontal direction X inside the cooling tube group 21. The non-condensed gas discharge unit 33 is arranged in the second horizontal direction at the downstream end portion in the flow direction of the steam in the cooling tube group 21. The non-condensed gas discharge unit 33 is the hollow box body having a rectangular cross-section, and the opening portions 34 are formed in the front surface portion 33a on the hollow portion 32 side. The non-condensed gas discharge unit 33 is arranged higher by a predetermined height H1 relative to the horizontal center line O1 of the cooling tube group 21.

A partition member 41 is opened to the hollow portion 32 side from the opening portion 34 side of the non-condensed gas discharge unit 33. The partition member 41 is formed of an upper partition plate 42 and a lower partition plate 43. The upper partition plate 42 is arranged in the second horizontal direction, and has a proximal end portion connected to the upper portion of the front surface portion 33a of the non-condensed gas discharge unit 33. The lower partition plate 43 is arranged in the second horizontal direction, and has a proximal end portion connected to the lower portion of the front surface portion 33a of the non-condensed gas discharge unit 33. Furthermore, the upper partition plate 42 and the lower partition plate 43 respectively have distal end portions in communication with the hollow portion 32.

The upper partition plate 42 horizontally extends toward the hollow portion 32 side. The lower partition plate 43 extends downward at a predetermined inclination angle toward the hollow portion 32 side and then horizontally extends. Therefore, in the partition member 41, the upper partition plate 42 and the lower partition plate 43 are arranged such that an interval (distance) therebetween becomes larger toward the hollow portion 32 side. Furthermore, the partition member 41 (upper partition plate 42 and lower partition plate 43) is opened to the hollow portion 32 side from the non-condensed gas discharge unit 33 and has the distal end portion in communication with the hollow portion 32.

Additionally, as illustrated in FIG. 6, the cooling tube group 21 is elongated in the first horizontal direction X by arranging the plurality of cooling tubes 31 in the second horizontal direction (orthogonal to the drawing paper surface) in parallel at predetermined intervals. A hollow portion 44 is formed in the first horizontal direction X inside the cooling tube group 21. The non-condensed gas discharge unit 33 is arranged in the second horizontal direction at a downstream end portion in the flow direction of the steam in the cooling tube group 21. The non-condensed gas discharge unit 33 is the hollow box body having a rectangular cross-section, and the opening portions 34 are formed in the front surface portion 33a on the hollow portion 44 side.

The partition member 35 is opened to the hollow portion 44 side from the opening portion 34 side of the non-condensed gas discharge unit 33. The partition member 35 is formed of the upper partition plate 36 and the lower partition plate 37. The upper partition plate 36 extends upward at a predetermined inclination angle toward the hollow portion 44 side and then horizontally extends. The lower partition plate 37 extends downward at a predetermined inclination angle toward the hollow portion 44 side and then horizontally extends. Therefore, in the partition member 35, the upper partition plate 36 and the lower partition plate 37 are arranged such that an interval (distance) therebetween becomes larger toward the hollow portion 44 side. Additionally, the hollow portion 44 has an end portion extending to an area interposed between the upper partition plate 36 and the lower partition plate 37. Furthermore, the lower partition plate 37 is formed with a drain hole 45 at a position facing the end portion of the hollow portion 44.

Additionally, as illustrated in FIG. 7, the cooling tube group 21 is elongated in the first horizontal direction X by arranging the plurality of cooling tubes 31 in the second horizontal direction (orthogonal to the drawing paper surface) in parallel at predetermined intervals. The hollow portion 32 is formed in the first horizontal direction X inside the cooling tube group 21. The non-condensed gas discharge unit 33 is arranged in the second horizontal direction at a downstream end portion in the flow direction of the steam in the cooling tube group 21. The non-condensed gas discharge unit 33 is the hollow box body having a rectangular cross-section, and the opening portions 34 are formed in the front surface portion 33a on the hollow portion 32 side.

The partition member 35 is opened to the hollow portion 32 side from the opening portion 34 side of the non-condensed gas discharge unit 33. The partition member 35 is formed of the upper partition plate 36 and the lower partition plate 37. The upper partition plate 36 extends upward at a predetermined inclination angle toward the hollow portion 32 side and then horizontally extends. The lower partition plate 37 extends downward at a predetermined inclination angle toward the hollow portion 32 side and then horizontally extends. Therefore, in the partition member 35, the upper partition plate 36 and the lower partition plate 37 are arranged such that an interval (distance) therebetween becomes larger toward the hollow portion 32 side. Furthermore, in the hollow portion 32, a plurality of saucers 46 is arranged at the lower portion in the second horizontal direction at predetermined intervals in the first horizontal direction X. The plurality of saucers 46 is adapted to receive and then discharge, to the outside, the condensate W generated by the steam S contacting the cooling tubes 31 in the cooling tube group upper area 21A. Additionally, when the condensate W generated by condensing the steam S falls down, adhesion of the condensate to the cooling tubes 31 in the cooling tube group upper area 21A can be suppressed, also vertical flow of the steam S is enabled, and degradation of condensation performance can be suppressed.

Since the behavior of the modified examples as the condenser is substantially the same as that of the first embodiment, the description thereof will be omitted.

Second Embodiment

Figure 8:
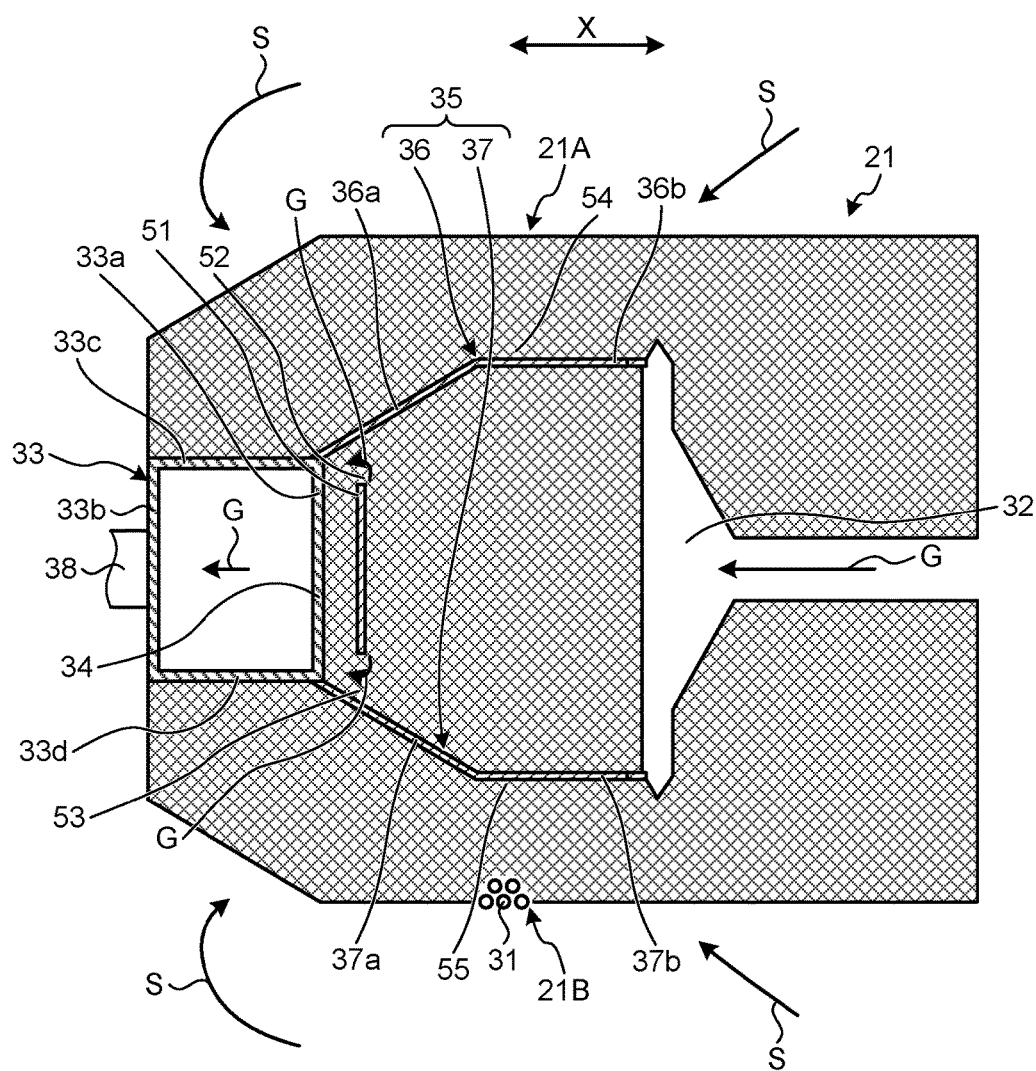
FIG. 8 is a schematic diagram illustrating a main portion of a cooling tube group in a condenser according to a second embodiment.

FIG. 8 is a schematic diagram illustrating a main portion of a cooling tube group in a condenser according to a second embodiment. Note that components having the same functions as in the embodiment described above are denoted by the same reference signs, and a detailed description thereof will be omitted.

In the condenser according to the second embodiment, as illustrated in FIG. 8, a cooling tube group 21 is elongated in a first horizontal direction X by arranging a plurality of cooling tubes 31 in a second horizontal direction (orthogonal to the drawing paper surface) in parallel at predetermined intervals. A hollow portion 32 is formed in the first horizontal direction X inside the cooling tube group 21. A non-condensed gas discharge unit 33 is arranged in the second horizontal direction at a downstream end portion in a flow direction of steam in the cooling tube group 21. The non-condensed gas discharge unit 33 is a hollow box body having a rectangular cross-section, and opening portions 34 are formed in a front surface portion 33a on the hollow portion 32 side.

A partition member 35 is opened to the hollow portion 32 side from the opening portion 34 side of the non-condensed gas discharge unit 33. The partition member 35 is formed of an upper partition plate 36 and a lower partition plate 37. The upper partition plate 36 extends upward at a predetermined inclination angle toward the hollow portion 32 side and then horizontally extends. The lower partition plate 37 extends downward at a predetermined inclination angle toward the hollow portion 32 side and then horizontally extends. Therefore, in the partition member 35, the upper partition plate 36 and the lower partition plate 37 are arranged such that an interval (distance) therebetween becomes larger toward the hollow portion 32 side.

In the present embodiment, a baffle plate 51 is arranged at a position separated from the non-condensed gas discharge unit 33 to the hollow portion 32 side by a predetermined distance in a manner facing the opening portions 34 and keeping a predetermined space from the upper partition plate 36 and the lower partition plate 37. The baffle plate 51 is vertically formed and arranged in the second horizontal direction, and the cooling tubes 31 are arranged in a space between the baffle plate 51 and the non-condensed gas discharge unit 33 (opening portions 34). Additionally, the baffle plate 51 is provided with an upper passage 52 between an upper end thereof and a lower surface of the upper partition plate 36, and also provided with a lower passage 53 between a lower end thereof and an upper surface of the lower partition plate 37.

Furthermore, the upper partition plate 36 is provided with an upper gas flow passage 54 along an upper surface, and the lower partition plate 37 is provided with a lower gas flow passage 55 along a lower surface. The upper gas flow passage 54 and the lower gas flow passage 55 are in communication with the hollow portion 32. The upper gas flow passage 54 is provided above an inclined portion 36a and a horizontal portion 36b of the upper partition plate 36. On the other hand, the lower gas flow passage 55 is provided below an inclined portion 37a and a horizontal portion 37b of the lower partition plate 37.

Here, the upper passage 52, lower passage 53, upper gas flow passage 54, and lower gas flow passage 55 are, for example, passages and flow passages each having a space larger than a space between the cooling tubes 31 adjacent to each other. More specifically, the upper gas flow passage 54 and the lower gas flow passage 55 are provided outside the upper partition plate 36 and the lower partition plate 37, and spaces between outer surfaces of the upper partition plate 36 and the lower partition plate 37 and the cooling tubes 31 are set larger than spaces between inner surfaces of the upper partition plate 36 and the lower partition plate 37 and the cooling tubes 31.

Therefore, the steam S reaches the cooling tube group 21 and contacts the multiple cooling tubes 31, thereby performing heat exchange between the steam S and cooling water C contained inside the respective cooling tubes 31. Then, the steam S is cooled and condensed into condensate W. At this point, negative pressure is applied to the non-condensed gas discharge unit 33 by actuation of a vacuum pump, and suction force is applied to the hollow portion 32 by the partition member 35. Therefore, the steam S moves to the inside of the hollow portion 32 through the cooling tube group 21, and then moves between the upper partition plate 36 and the lower partition plate 37 to the non-condensed gas discharge unit 33 side while contacting the cooling tubes 31. On the other hand, the steam S having flowed inside from the back of the cooling tube group 21 reaches the outside of the non-condensed gas discharge unit 33 and the outside of the upper partition plate 36 and the lower partition plate 37. Then, during this time, the steam S is condensed by contacting the cooling tubes 31, and the steam S passes through the upper gas flow passage 54 and the lower gas flow passage 55, and then moves to the hollow portion 32. After that, as described above, the steam S moves between the upper partition plate 36 and the lower partition plate 37 to the non-condensed gas discharge unit 33 side while contacting the cooling tubes 31.

Then, the steam S having moved to the non-condensed gas discharge unit 33 side is further condensed by contacting the cooling tubes 31, and bypasses the baffle plate 51, and passes through the upper passage 52 and the lower passage 53, thereby accelerating the flow speed. After that, the steam S finally contacts the cooling tubes 31 at a high speed, and mostly becomes air non-condensed gas G. Then, the non-condensed gas G is collected inside the non-condensed gas discharge unit 33 from the opening portions 34.

Thus, in the condenser according to the second embodiment, provided are: the cooling tube group 21 formed of the plurality of cooling tubes 31; the hollow portion 32 formed inside the cooling tube group 21 in the first horizontal direction X; the non-condensed gas discharge unit 33 arranged at the downstream end portion in the flow direction of the steam S in the cooling tube group 21, and including the opening portions 34 on the hollow portion 32 side; the partition member 35 opened to the hollow portion 32 side from the opening portion 34 side of the non-condensed gas discharge unit 33; and the baffle plate 51 arranged at the position separated from the non-condensed gas discharge unit 33 to the hollow portion 32 side by the predetermined distance in a manner facing the opening portions 34 and keeping the predetermined space from the upper partition plate 36 and the lower partition plate 37.

Therefore, the steam S having passed through the cooling tube group 21 and moved to the hollow portion 32 is guided by the partition member 35 and moves to the non-condensed gas discharge unit 33 side. At this point, the steam S (non-condensed gas G) flowing from the hollow portion 32 to the non-condensed gas discharge unit 33 bypasses the baffle plate 51 and passes through the upper passage 52 and the lower passage 53, thereby accelerating the flow speed. Then, the steam S contacts the cooling tubes 31 at the high speed and mostly becomes the air non-condensed gas G, and the non-condensed gas G is collected in the non-condensed gas discharge unit 33 from the opening portions 34. As a result, condensation performance can be improved.

In the condenser according to the second embodiment, the upper gas flow passage 54 is provided along the upper surface of the upper partition plate 36 and also the lower gas flow passage 55 is provided along the lower surface of the lower partition plate 37. The upper gas flow passage 54 and the lower gas flow passage 55 are in communication with the hollow portion 32. Therefore, the steam S having flowed inside by passing around the cooling tube group 21 is condensed by contacting the cooling tubes 31, and the steam S partly condensed passes through the upper gas flow passage 54 and the lower gas flow passage 55 and moves to the hollow portion 32. Consequently, the generated non-condensed gas G can be properly guided to the hollow portion 32.

Third Embodiment

Figure 9:
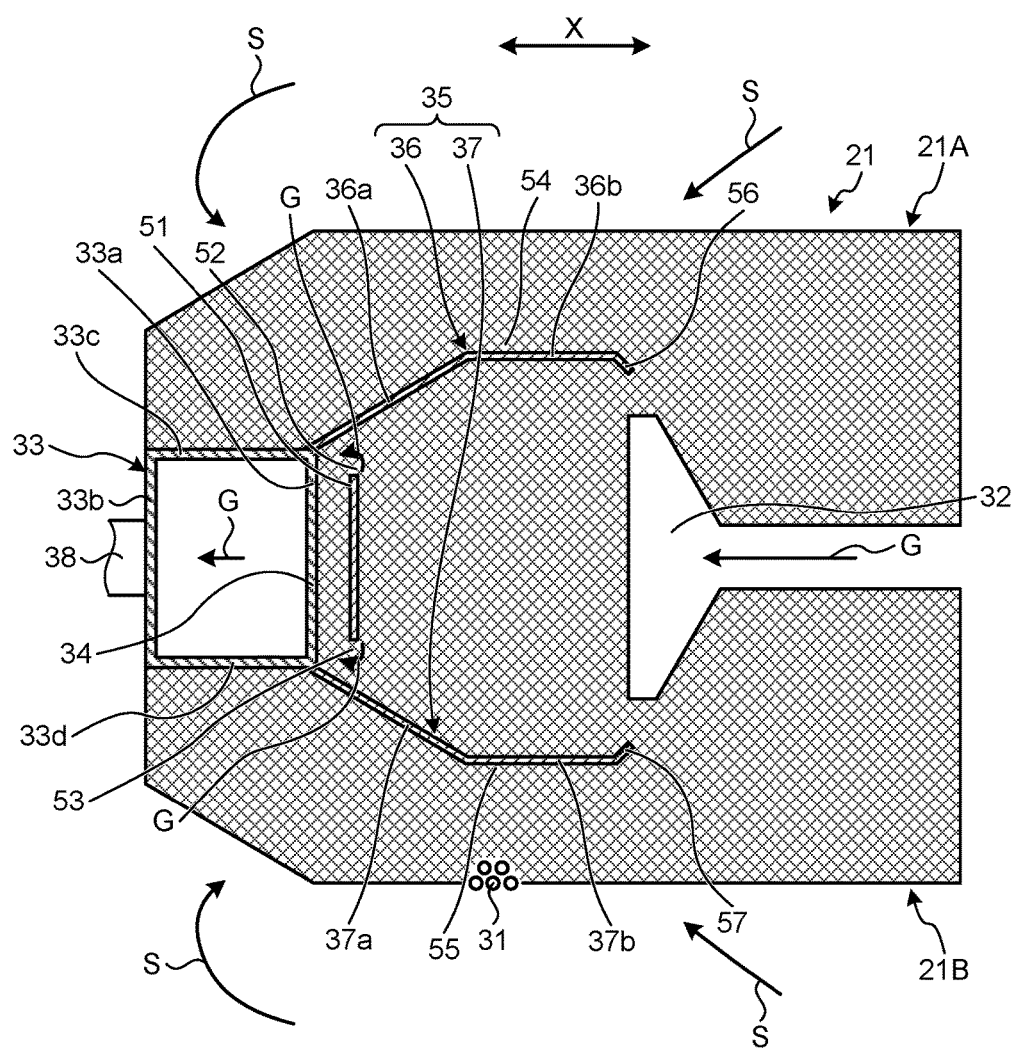
FIG. 9 is a schematic diagram illustrating a main portion of a cooling tube group in a condenser according to a third embodiment.

FIG. 9 is a schematic diagram illustrating a main portion of a cooling tube group in a condenser according to a third embodiment. Note that components having the same functions as in the embodiments described above are denoted by the same reference signs, and a detailed description thereof will be omitted.

In the condenser according to the third embodiment, as illustrated in FIG. 9, a cooling tube group 21 is elongated in a first horizontal direction X by arranging a plurality of cooling tubes 31 in a second horizontal direction (orthogonal to the drawing paper surface) in parallel at predetermined intervals. A hollow portion 32 is formed in the first horizontal direction X inside the cooling tube group 21. A non-condensed gas discharge unit 33 is arranged in the second horizontal direction at a downstream end portion in the flow direction of the steam in the cooling tube group 21. The non-condensed gas discharge unit 33 is a hollow box body having a rectangular cross-section, and opening portions 34 are formed in a front surface portion 33a on the hollow portion 32 side.

A partition member 35 is opened to the hollow portion 32 side from the opening portion 34 side of the non-condensed gas discharge unit 33. The partition member 35 is formed of an upper partition plate 36 and a lower partition plate 37. The upper partition plate 36 extends upward at a predetermined inclination angle toward the hollow portion 32 side and then horizontally extends. The lower partition plate 37 extends downward at a predetermined inclination angle toward the hollow portion 32 side and then horizontally extends. Therefore, in the partition member 35, the upper partition plate 36 and the lower partition plate 37 are arranged such that an interval (distance) therebetween becomes larger toward the hollow portion 32 side.

A baffle plate 51 is arranged at a position separated from the non-condensed gas discharge unit 33 to the hollow portion 32 side by a predetermined distance in a manner facing the opening portions 34 and keeping a predetermined space from the upper partition plate 36 and the lower partition plate 37. The cooling tubes 31 are arranged in a space between the baffle plate 51 and the non-condensed gas discharge unit 33 (opening portions 34), an upper passage 52 is provided in a space between the baffle plate 51 and the upper partition plate 36, and a lower passage 53 is provided in a space between the baffle plate 51 and the lower partition plate 37.

Furthermore, the upper partition plate 36 is provided with an upper gas flow passage 54 along an upper surface, and the lower partition plate 37 is provided with a lower gas flow passage 55 along a lower surface. The upper gas flow passage 54 and the lower gas flow passage 55 extend to the hollow portion 32 side while the cooling tubes 31 are arranged in a space between the upper and lower gas flow passages and the hollow portion 32. Additionally, the upper partition plate 36 and the lower partition plate 37 have distal end portions provided with an upper guide portion 56 and a lower guide portion 57 respectively which are bent in directions approaching to each other. The upper guide portion 56 and the lower guide portion 57 are provided close to the cooling tubes 31.

Therefore, steam S reaches the cooling tube group 21 and contacts the multiple cooling tubes 31, thereby performing heat exchange between the steam S and cooling water C contained inside the respective cooling tubes 31. Then, the steam S is cooled and condensed into condensate W. At this point, negative pressure is applied to the non-condensed gas discharge unit 33 by actuation of a vacuum pump, and suction force is applied to the hollow portion 32 by the partition member 35. Therefore, the steam S moves to the inside of the hollow portion 32 through the cooling tube group 21, and then moves between the upper partition plate 36 and the lower partition plate 37 to the non-condensed gas discharge unit 33 side while contacting the cooling tubes 31. On the other hand, the steam S having entered from the back of the cooling tube group 21 reaches the outside of the non-condensed gas discharge unit 33 and the outside of the upper partition plate 36 and the lower partition plate 37. Furthermore, during this time, the steam S is condensed by contacting the cooling tubes 31, and moves to the hollow portion 32 by passing through the upper gas flow passage 54 and the lower gas flow passage 55. When the steam S moves from the upper gas flow passage 54 and the lower gas flow passage 55 to the hollow portion 32, the steam S is condensed by contacting again the cooling tubes 31. After that, as described above, the steam S moves between the upper partition plate 36 and the lower partition plate 37 to the non-condensed gas discharge unit 33 side while contacting the cooling tubes 31.

At this point, the steam S moving in the upper gas flow passage 54 and the lower gas flow passage 55 is prevented from slipping away to inner surface sides of the upper partition plate 36 and the lower partition plate 37 by means of the upper guide portion 56 and the lower guide portion 57. Then, the steam S having moved to the non-condensed gas discharge unit 33 side is further condensed by contacting the cooling tubes 31, and bypasses the baffle plate 51, and passes through the upper passage 52 and the lower passage 53, thereby accelerating the flow speed. After that, the steam S finally contacts the cooling tubes 31 at a high speed, and mostly becomes air non-condensed gas G. Then, the non-condensed gas G is collected inside the non-condensed gas discharge unit 33 from the opening portions 34.

Thus, in the condenser according to the third embodiment, provided are: the cooling tube group 21 formed of the plurality of cooling tubes 31; the hollow portion 32 formed inside the cooling tube group 21 in the first horizontal direction X; the non-condensed gas discharge unit 33 arranged at the downstream end portion in the flow direction of the steam S in the cooling tube group 21, and including the opening portions 34 on the hollow portion 32 side; the partition member 35 opened to the hollow portion 32 side from the opening portion 34 side of the non-condensed gas discharge unit 33; and the upper gas flow passage 54 and the lower gas flow passage 55 respectively provided along the upper surface of the upper partition plate 36 and along the lower surface of the lower partition plate 37. The cooling tubes 31 are arranged between the upper and lower gas flow passages 54, 55 and the hollow portion 32.

Therefore, the steam S having passed through the cooling tube group 21 and moved to the hollow portion 32 is guided by the partition member 35 and moves to the non-condensed gas discharge unit 33 side. At this point, the steam S flowing inside by passing around the cooling tube group 21 is condensed by contacting the cooling tubes 31, and the generated non-condensed gas G passes through the upper gas flow passage 54 and the lower gas flow passage 55 and moves to the hollow portion 32. When the non-condensed gas G contains the steam S, the steam S can be condensed by contacting the cooling tubes 31. As a result, condensation performance can be improved.

In the condenser according to the third embodiment, the upper partition plate 36 and the lower partition plate 37 have the distal end portions provided with the upper guide portion 56 and the lower guide portion 57 respectively which are bent in the directions approaching to each other. Therefore, the steam S having entered the inside by passing around the cooling tube group 21 is condensed by contacting the cooling tubes 31. The generated air G passes through the upper gas flow passage 54 and the lower gas flow passage 55 and moves to the hollow portion 32. At this point, when the air G contains the steam S, the steam is prevented from flowing between the upper partition plate 36 and the lower partition plate 37 by means of the upper guide portion 56 and the lower guide portion 57.

Fourth Embodiment

Figure 10:
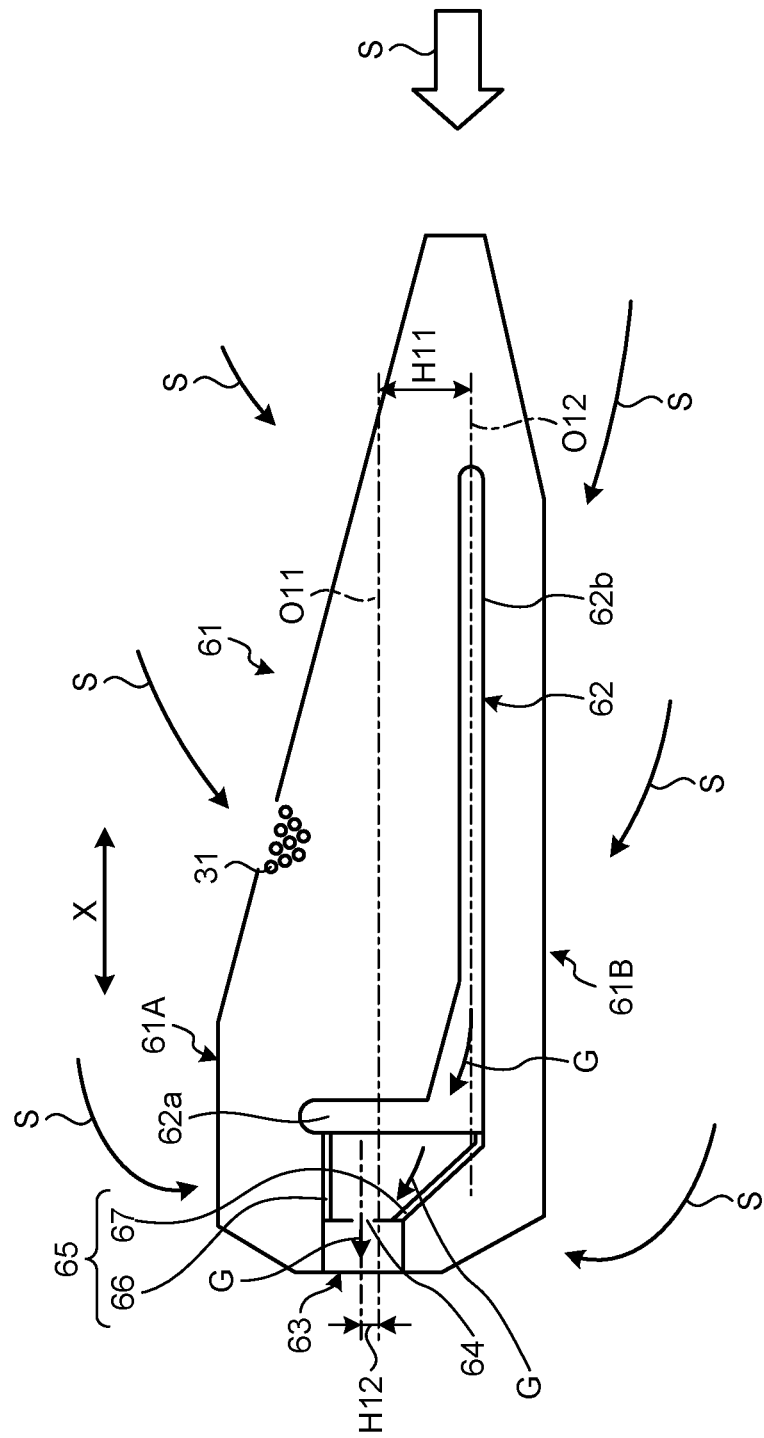
FIG. 10 is a schematic diagram illustrating a cooling tube group in a condenser according to a fourth embodiment.

FIG. 10 is a schematic diagram illustrating a cooling tube group in a condenser according to a fourth embodiment. Note that components having the same functions as in the embodiments described above are denoted by the same reference signs, and a detailed description thereof will be omitted.

In the condenser according to the fourth embodiment, as illustrated in FIG. 10, a cooling tube group 61 is elongated in a first horizontal direction X by arranging a plurality of cooling tubes 31 in a second horizontal direction (orthogonal to the drawing paper surface) in parallel at predetermined intervals. Furthermore, the cooling tube group 61 has a shape tapered toward an upstream side in a flow direction of steam S. More specifically, a length dimension in the first horizontal direction X of the cooling tube group 61 is set larger than a height (thickness) in the vertical direction. A hollow portion 62 is formed in the first horizontal direction X inside the cooling tube group 61. The hollow portion 62 includes a first hollow portion 62a provided on a downstream side in the flow direction of the steam S (first horizontal direction X) and a second hollow portion 62b provided extending from the first hollow portion 62a toward the upstream side in the flow direction of the steam S (first horizontal direction X). The first hollow portion 62a has a cross-section formed in the vertical direction, and the second hollow portion 62b has a cross-section formed in the horizontal direction. The first hollow portion 62a is in communication with the second hollow portion 62b.

A non-condensed gas discharge unit 63 is arranged in the second horizontal direction at a downstream end portion in the flow direction of the steam S in the cooling tube group 61. The non-condensed gas discharge unit 63 is a hollow box body having a rectangular cross-section, and opening portions 64 are formed on the hollow portion 62 side. A horizontal center line O11 in the cooling tube group 61 is located in a manner shifted upward by a predetermined height H11 relative to a horizontal center line O12 in the hollow portion 62. Therefore, the cooling tube group 61 is divided into a cooling tube group upper area 61A and a cooling tube group lower area 61B relative to the hollow portion 62 located on the center line O12, and a thickness (height) of the cooling tube group upper area 61A is set thicker (taller) than that of the cooling tube group lower area 61B. Furthermore, the non-condensed gas discharge unit 63 is arranged in a manner shifted upward by a predetermined height H12 relative to the horizontal center line O11 in the cooling tube group 61.

A partition member 65 is opened to the hollow portion 62 side from the opening portion 64 side of the non-condensed gas discharge unit 63. The partition member 65 is formed of an upper partition plate 66 and a lower partition plate 67. The upper partition plate 66 is arranged in the second horizontal direction, and has a proximal end portion connected to an upper portion of the non-condensed gas discharge unit 63. The lower partition plate 67 is arranged in the second horizontal direction, and has a proximal end portion connected to a lower portion of the non-condensed gas discharge unit 63. Furthermore, the upper partition plate 66 and the lower partition plate 67 have respective distal end portions in communication with the hollow portion 62.

The upper partition plate 66 horizontally extends toward the hollow portion 62 side. The lower partition plate 67 extends downward at a predetermined inclination angle toward the hollow portion 62 side and then horizontally extends. Therefore, in the partition member 65, the upper partition plate 66 and the lower partition plate 67 are arranged such that an interval (distance) therebetween becomes larger toward the hollow portion 62 side.

Therefore, the steam S reaches the cooling tube group 61 and contacts the multiple cooling tubes 31, thereby performing heat exchange between the steam S and cooling water C contained inside the respective cooling tubes 31. Then, the steam S is cooled and condensed into condensate W. At this point, negative pressure is applied to the non-condensed gas discharge unit 63 by actuation of a vacuum pump, and suction force is applied to the hollow portion 62 by the partition member 65. Therefore, the steam S moves into the hollow portion 62 through the cooling tube group 61, and then moves between the upper partition plate 66 and the lower partition plate 67 to the non-condensed gas discharge unit 63 side while contacting the cooling tubes 31. Then, the steam S having moved to the non-condensed gas discharge unit 63 side is further condensed by contacting the cooling tubes 31 and mostly becomes non-condensed gas G, and the non-condensed gas G is collected inside the non-condensed gas discharge unit 63 from the opening portions 64.

Thus, in the condenser according to the fourth embodiment, the cooling tube group 61 is divided into the cooling tube group upper area 61A and the cooling tube group lower area 61B relative to the hollow portion 62, and the thickness in the vertical direction of the cooling tube group upper area 61A is set thicker than the thickness in the vertical direction of the cooling tube group lower area 61B.

Therefore, when the steam S flows toward the cooling tube group 61, the generated condensate falls downward and adheres to the cooling tubes 31 in the cooling tube group lower area 61B. However, since the thickness of the cooling tube group upper area 61A is thicker than the cooling tube group lower area 61B, a more amount of steam S is condensed at the cooling tubes 31 in the cooling tube group upper area 61A, thereby improving condensation performance.

Figure 11:
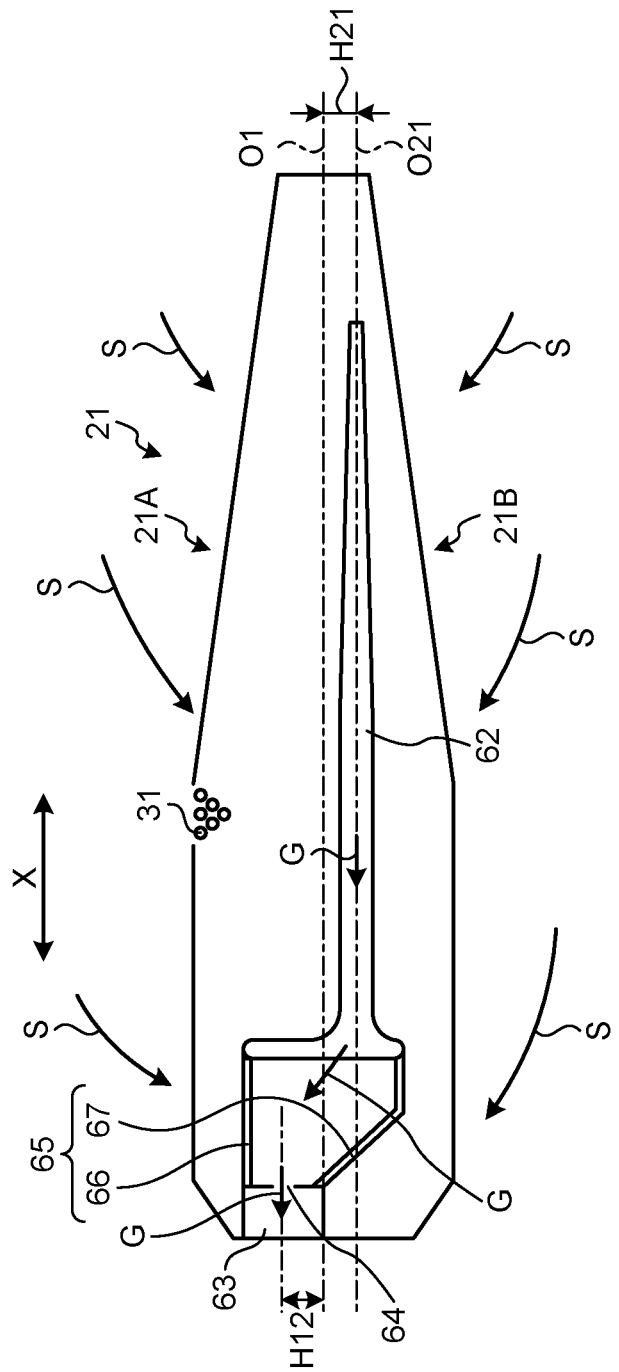
FIG. 11 is a schematic diagram illustrating a modified example of the cooling tube group in the condenser according to the fourth embodiment.
Figure 12:
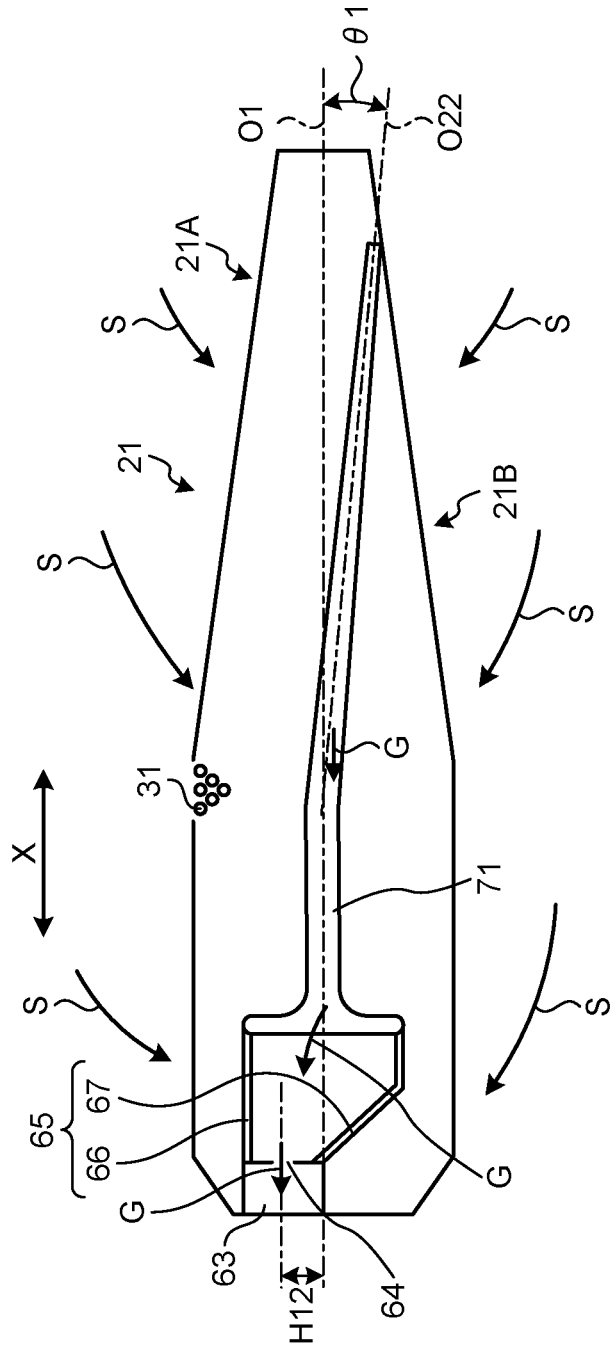
FIG. 12 is a schematic diagram illustrating a modified example of the cooling tube group in the condenser according to the fourth embodiment.
Figure 13:
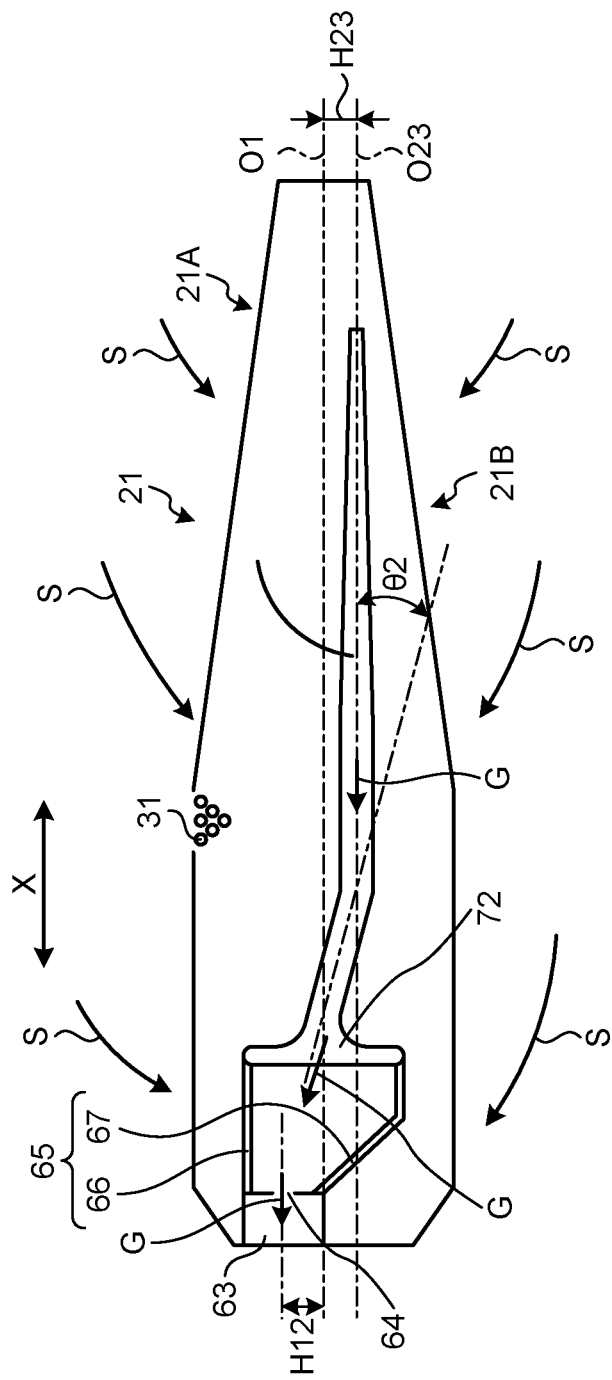
FIG. 13 is a schematic diagram illustrating a modified example of the cooling tube group in the condenser according to the fourth embodiment.

The shapes of the cooling tube group 61, hollow portion 62, non-condensed gas discharge unit 63, and partition member 65 are not limited to the above-described embodiment. FIGS. 11 to 13 are schematic diagrams illustrating modified examples of the cooling tube group in the condenser according to the fourth embodiment.

As illustrated in FIG. 11, the cooling tube group 21 is elongated in the first horizontal direction X by arranging the plurality of cooling tubes 31 in the second horizontal direction (orthogonal to the drawing paper surface) in parallel at predetermined intervals. The hollow portion 62 is formed in the first horizontal direction X inside the cooling tube group 21. The non-condensed gas discharge unit 63 is arranged in the second horizontal direction at the downstream end portion in the flow direction of the steam S in the cooling tube group 21, and the opening portions 64 are formed on the hollow portion 62 side. The horizontal center line O1 in the cooling tube group 21 is located in a manner shifted upward by a predetermined height H21 relative to a horizontal center line O21 in the hollow portion 62. Therefore, the cooling tube group 21 is divided into the cooling tube group upper area 21A and the cooling tube group lower area 21B relative to the hollow portion 62 located on the center line O21, and a thickness (height) of the cooling tube group upper area 21A is set thicker (taller) than that of the cooling tube group lower area 21B. Furthermore, the non-condensed gas discharge unit 63 is arranged in a manner shifted upward by the predetermined height H12 relative to the horizontal center line O1 in the cooling tube group 21.

The partition member 65 is opened to the hollow portion 62 side from the opening portion 64 side of the non-condensed gas discharge unit 63. The partition member 65 is formed of the upper partition plate 66 and the lower partition plate 67. The upper partition plate 66 has the proximal end portion connected to the upper portion of the non-condensed gas discharge unit 63, and horizontally extends toward the hollow portion 62 side. The lower partition plate 67 has the proximal end portion connected to the lower portion of the non-condensed gas discharge unit, extends downward at a predetermined inclination angle toward the hollow portion 62 side, and then horizontally extends. Furthermore, the upper partition plate 66 and the lower partition plate 67 have respective distal end portions in communication with the hollow portion 62.

Additionally, as illustrated in FIG. 12, the cooling tube group 21 is elongated in the first horizontal direction X by arranging the plurality of cooling tubes 31 in the second horizontal direction (orthogonal to the drawing paper surface) in parallel at predetermined intervals. A hollow portion 71 is formed in the first horizontal direction X inside the cooling tube group 21. The non-condensed gas discharge unit 63 is arranged in the second horizontal direction at the downstream end portion in the flow direction of the steam S in the cooling tube group 21, and the opening portions 64 are formed on the hollow portion 71 side. The hollow portion 71 is arranged in a manner such that a distal end portion side of a center line O22 is inclined downward by a predetermined angle θ1 relative to the horizontal center line O1 in the cooling tube group 21. Therefore, the cooling tube group 21 is divided into the cooling tube group upper area 21A and the cooling tube group lower area 21B relative to the hollow portion 71 located on the center line O22, and a thickness (height) of the cooling tube group upper area 21A is set thicker (taller) than that of the cooling tube group lower area 21B.

Additionally, as illustrated in FIG. 13, the cooling tube group 21 is elongated in the first horizontal direction X by arranging the plurality of cooling tubes 31 in the second horizontal direction (orthogonal to the drawing paper surface) in parallel at predetermined intervals. A hollow portion 72 is formed in the first horizontal direction X inside the cooling tube group 21. The non-condensed gas discharge unit 63 is arranged in the second horizontal direction at the downstream end portion in the flow direction of the steam S in the cooling tube group 21, and the opening portions 64 are formed on the hollow portion 72 side. The hollow portion 72 has a distal end portion side inclined downward by a predetermined angle θ2 relative to the horizontal center line O1 in the cooling tube group 21, and then extending horizontally. Furthermore, the horizontal center line O1 in the cooling tube group 21 is located in a manner shifted upward by a predetermined height H23 relative to a horizontal center line O23 in the hollow portion 72. Therefore, the cooling tube group 21 is divided into the cooling tube group upper area 21A and the cooling tube group lower area 21B relative to the hollow portion 72 located on the center line O23, and a thickness (height) of the cooling tube group upper area 21A is set thicker (taller) than that of the cooling tube group lower area 21B.

Since the behavior of the modified examples as the condenser is substantially the same as that of the fourth embodiment, the description thereof will be omitted.

Fifth Embodiment

Figure 14:
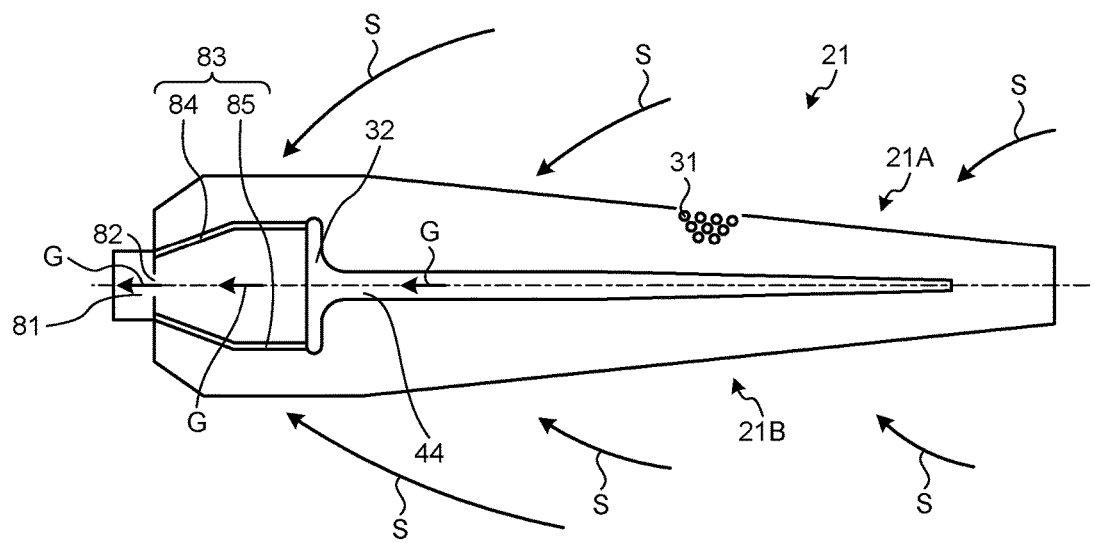
FIG. 14 is a schematic diagram illustrating a cooling tube group in a condenser according to a fifth embodiment.

FIG. 14 is a schematic diagram illustrating a cooling tube group in a condenser according to a fifth embodiment. Note that components having the same functions as in the embodiments described above are denoted by the same reference signs, and a detailed description thereof will be omitted.

In the condenser according to the fifth embodiment, as illustrated in FIG. 14, a cooling tube group 21 is elongated in a first horizontal direction X by arranging a plurality of cooling tubes 31 in a second horizontal direction (orthogonal to the drawing paper surface) in parallel at predetermined intervals. A hollow portion 32 is formed in the first horizontal direction X inside the cooling tube group 21. A non-condensed gas discharge unit 81 is arranged in the second horizontal direction at a downstream end portion in a flow direction of steam in the cooling tube group 21. The non-condensed gas discharge unit 81 is a hollow box body having a rectangular cross-section, and opening portions 82 are formed on the hollow portion 32 side. The non-condensed gas discharge unit 81 is arranged in a manner projecting outward from the cooling tube group 21, facing a steam passage, and also facing an inner wall surface of a vessel.

A partition member 83 is opened to the hollow portion 32 side from the opening portion 82 side of the non-condensed gas discharge unit 81. The partition member 83 is formed of an upper partition plate 84 and a lower partition plate 85, and has a distal end portion in communication with the hollow portion 32.

In the condenser according to the fifth embodiment, the non-condensed gas discharge unit 81 has the hollow shape and is arranged in a manner projecting outward from the cooling tube group 21, facing the steam passage, and also facing the inner wall surface of the vessel.

Therefore, since the non-condensed gas discharge unit 81 is formed in a manner projecting outward from the cooling tube group 21, the number of the cooling tubes 31 can be increased and condensation performance can be improved. Additionally, since one surface of the non-condensed gas discharge unit 81 faces the inner wall surface of the vessel, an air discharge pipe to discharge the non-condensed gas collected in the non-condensed gas discharge unit 81 to the outside of the vessel can be easily arranged, and the structure can be simplified.

Sixth Embodiment

Figure 15:
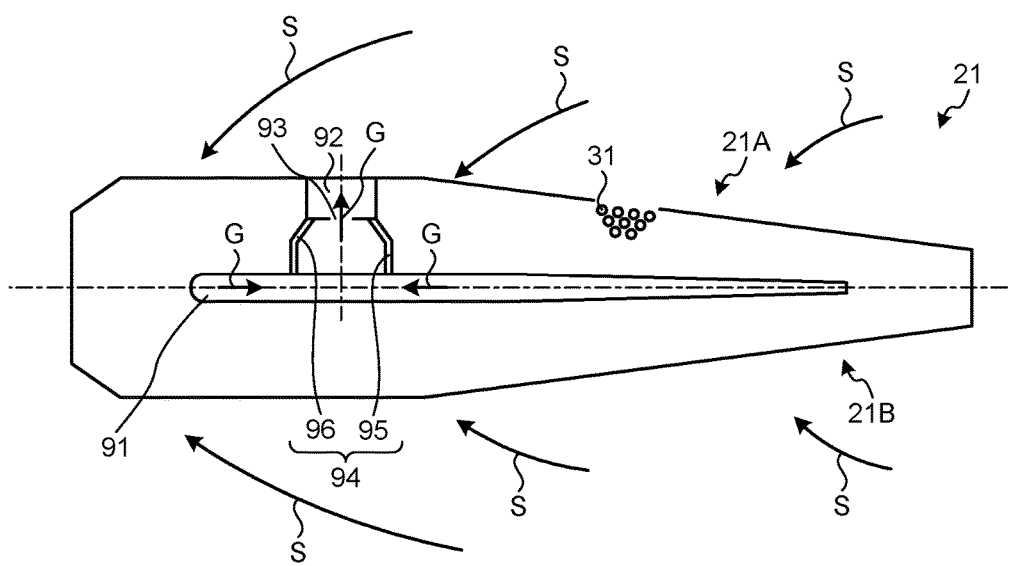
FIG. 15 is a schematic diagram illustrating a cooling tube group in a condenser according to a sixth embodiment.

FIG. 15 is a schematic diagram illustrating a cooling tube group in a condenser according to a sixth embodiment. Note that components having the same functions as in the embodiments described above are denoted by the same reference signs, and a detailed description thereof will be omitted.

In the condenser according to the sixth embodiment, as illustrated in FIG. 15, a cooling tube group 21 is elongated in a first horizontal direction X by arranging a plurality of cooling tubes 31 in a second horizontal direction (orthogonal to the drawing paper surface) in parallel at predetermined intervals. A hollow portion 91 is formed in the first horizontal direction X inside the cooling tube group 21. A non-condensed gas discharge unit 92 is arranged in the second horizontal direction at a vertically upper portion of the cooling tube group 21. The non-condensed gas discharge unit 92 is a hollow box body having a rectangular cross-section, and opening portions 93 are formed on the hollow portion 91 (lower) side.

A partition member 94 is opened to the hollow portion 91 side from the opening portion 93 side of the non-condensed gas discharge unit 92. The partition member 94 is formed of a first partition plate 95 and a second partition plate 96. In the partition member 94, the first partition plate 95 and the second partition plate 96 are arranged such that an interval (distance) therebetween becomes larger toward the hollow portion 91 side.

Thus, in the condenser according to the sixth embodiment, provided are: the cooling tube group 21 is elongated in the first horizontal direction X by arranging the plurality of cooling tubes 31 in the second horizontal direction in parallel; the hollow portion 91 formed in the first horizontal direction X inside the cooling tube group 21; the non-condensed gas discharge unit 92 arranged in the second horizontal direction at the upper portion of the cooling tube group 21 and including the opening portions 93 on the hollow portion 91 side; and the partition member 94 opened to the hollow portion 91 side from the opening portion 93 side of the non-condensed gas discharge unit 92.

Therefore, steam S enters the inside from the upper portion and the lower portion of the cooling tube group 21 and flows to the hollow portion 91. At this point, the steam S contacting the multiple cooling tubes 31, and the steam S is cooled and condensed into the condensate W. perform heat exchange. On the other hand, non-condensed gas G generated by cooling the steam S is guided by the partition member 94, collected in the non-condensed gas discharge unit 92 through the opening portions 93, and discharged to the outside. Since the cooling tube group 21 is elongated in the flow direction of the steam S and the hollow portion 91 is formed in the flow direction of the steam S inside thereof, the steam S efficiently contacts the cooling tubes 31 and also the non-condensed gas G can be properly separated. As a result, condensation performance can be improved. Moreover, since the non-condensed gas discharge unit 92 is arranged at the upper portion of the cooling tube group 21, a pipe to discharge the non-condensed gas G from the non-condensed gas discharge unit 92 can be easily connected, and manufacturing cost can be saved by simplifying the structure.

In the present invention, the shape of the cooling tube group is not limited to the respective embodiments, and preferably the cooling tube group is elongated in the first horizontal direction by arranging the plurality of cooling tubes in the second horizontal direction in parallel at predetermined intervals, and has a shape tapered toward the upstream side in the flow direction of steam.

REFERENCE SIGNS LIST

11 Vessel
12 Inflow port
21, 22, 23, 24, 61 Cooling tube group
31 Cooling tube
32, 44, 62, 71, 72, 91 Hollow portion
33, 63, 81, 92 Non-condensed gas discharge unit
34, 64, 82, 93 Opening portion
35, 41, 65, 94 Partition member
36, 42, 66 Upper partition plate
37, 43, 67 Lower partition plate
45 Drain hole
46 Saucer
51 Baffle plate
52 Upper passage
53 Lower passage
54 Upper gas flow passage
55 Lower gas flow passage
56 Upper guide portion
57 Lower guide portion
95 First partition plate
96 Second partition plate

The invention claimed is:
1. A condenser including:
 a vessel configured to receive a flow of steam in a first direction;
 a cooling tube group having an interior hollow portion and disposed inside the vessel, the cooling tube group having a length extending in the first direction, the cooling tube group being formed by arranging a plu- rality of cooling tube in a second direction which is orthogonal to the first direction;

a non-condensed gas discharge unit provided at a downstream end portion of the cooling tube group along the first direction, wherein the non-condensed gas discharge unit is elongated in the second direction and includes an opening directed toward the hollow portion; and a partition member extending from the open side of the non-condensed gas discharge unit toward the hollow portion.

2. The condenser according to claim 1, wherein the non-condensed gas discharge unit is a hollow structure arranged such that one surface of the non-condensed gas discharge unit faces an inner wall surface of the vessel, and other surfaces of the non-condensed gas discharge unit, other than the one surface, are surrounded by the cooling tube group.

3. The condenser according to claim 2, wherein
the partition member includes: an upper partition plate having a first end connected to an upper portion of the non-condensed gas discharge unit; and a lower partition plate having a first end connected to a lower portion of the non-condensed gas discharge unit, and
the upper partition plate and the lower partition plate have respective second ends positioned at a downstream end of the hollow portion.

4. The condenser according to claim 1, wherein the partition member includes: an upper partition plate having a first end connected to an upper portion of the non-condensed gas discharge unit; and a lower partition plate having a first end connected to a lower portion of the non-condensed gas discharge unit, and
the upper partition plate and the lower partition plate have respective second ends positioned at a downstream end of the hollow portion.

5. The condenser according to claim 4, wherein the upper partition plate extends from the first end upward at a predetermined inclination angle toward the hollow portion.

6. The condenser according to claim 5, wherein the upper partition plate and the lower partition plate are arranged such that a distance between the upper partition plate and the lower partition plate becomes larger in the upstream direction toward the hollow portion.

7. The condenser according to claim 5, further comprising a baffle plate arranged at a position upstream of the non-condensed gas discharge unit by a predetermined distance such that the partition plate opposes the open side of the non-condensed gas discharge unit,
the baffle plate being spaced from the upper partition plate and the lower partition plate.

8. The condenser according to claim 5, wherein an upper gas flow passage is provided along an upper surface of the upper partition plate, a lower gas flow passage is provided along a lower surface of the lower partition plate, and the upper gas flow passage and the lower gas flow passage are in fluid communication with the hollow portion.

9. The condenser according to claim 4, wherein the upper partition plate and the lower partition plate are arranged such that a distance between the upper partition plate and the lower partition plate becomes larger in a direction toward the hollow portion.

10. The condenser according to claim 9, further comprising a baffle plate arranged at a position upstream of the non-condensed gas discharge unit by a predetermined distance such that the partition plate opposes the open side of the non-condensed gas discharge unit,
the partition plate being spaced from the upper partition plate and the lower partition plate.

11. The condenser according to claim 9, wherein an upper gas flow passage is provided along an upper surface of the upper partition plate, a lower gas flow passage is provided along a lower surface of the lower partition plate, and the upper gas flow passage and the lower gas flow passage are in fluid communication with the hollow portion.

12. The condenser according to claim 4, further comprising a baffle plate arranged at a position upstream of the non-condensed gas discharge unit by a predetermined distance such that the partition plate opposes the open side of the non-condensed gas discharge unit,
the partition plate being spaced from the upper partition plate and the lower partition plate.

13. The condenser according to claim 4, wherein an upper gas flow passage is provided along an upper surface of the upper partition plate, a lower gas flow passage is provided along a lower surface of the lower partition plate, and the upper gas flow passage and the lower gas flow passage are in fluid communication with the hollow portion.

14. The condenser according to claim 13, wherein the upper partition plate and the lower partition plate have an upper guide portion and a lower guide portion, respectively, and the upper guide portion is inclined downwardly and the lower guide portion is inclined upwardly.

15. The condenser according to claim 4, wherein an upper gas flow passage is provided along an upper surface of the upper partition plate, a lower gas flow passage is provided along a lower surface of the lower partition plate, and the cooling tubes are arranged in a space between the upper and lower gas flow passages and the hollow portion.

16. The condenser according to claim 1, wherein a plurality of saucer-shaped units are arranged in the first direction at predetermined intervals at a lower portion of the hollow portion.

17. The condenser according to claim 1, wherein the cooling tube group, the hollow portion, the non-condensed gas discharge unit, and the partition member are disposed so as to be symmetric relative to a line extending in the first direction.

18. The condenser according to claim 1, wherein the cooling tube group is divided into an upper cooling tube subgroup and a lower cooling tube subgroup relative to the hollow portion, and a thickness of the upper cooling tube subgroup is greater than a thickness of the lower cooling tube subgroup.

19. The condenser according to claim 1, wherein the non-condensed gas discharge unit is a hollow structure that projects from the cooling tube group, and faces an inner wall surface of the vessel.

20. The condenser according to claim 1, wherein the hollow portion is tapered toward an upstream side of the cooling tube group.

21. The condenser according to claim 1, wherein the hollow portion, the partition member and the non-condensed gas discharge unit are arranged along the first direction,
wherein the partition member is disposed downstream of the hollow portion, and the non-condensed gas discharge unit is disposed downstream of the partition member.

* * * * *